US007249381B2

(12) United States Patent
Telesco

(10) Patent No.: US 7,249,381 B2
(45) Date of Patent: Jul. 24, 2007

(54) CONTROLLER AND RESOURCE MANAGEMENT SYSTEM AND METHOD WITH IMPROVED SECURITY FOR INDEPENDENTLY CONTROLLING AND MANAGING A COMPUTER SYSTEM

(75) Inventor: William James Telesco, Torrington, CT (US)

(73) Assignee: Bryte Computer Technologies, Inc., Torrington, CT (US)

( * ) Notice: Subject to any disclaimer, the term of this patent is extended or adjusted under 35 U.S.C. 154(b) by 400 days.

(21) Appl. No.: 10/811,618

(22) Filed: Mar. 29, 2004

(65) Prior Publication Data
US 2005/0228916 A1 Oct. 13, 2005

(51) Int. Cl.
G06F 7/04 (2006.01)
(52) U.S. Cl. .............................. 726/27; 726/26; 726/13; 718/103
(58) Field of Classification Search .................. 726/27, 726/26, 25, 23, 14, 13, 4, 2
See application file for complete search history.

(56) References Cited

U.S. PATENT DOCUMENTS

| 7,024,695 | B1* | 4/2006 | Kumar et al. .................. 726/26 |
| 2003/0237007 | A1* | 12/2003 | Ramirez ..................... 713/300 |
| 2004/0044891 | A1* | 3/2004 | Hanzlik et al. ............. 713/150 |
| 2004/0215992 | A1* | 10/2004 | Anderson et al. ........... 713/400 |
| 2005/0071668 | A1* | 3/2005 | Yoon et al. ................... 713/200 |
| 2005/0114687 | A1* | 5/2005 | Zimmer et al. ............. 713/193 |

OTHER PUBLICATIONS

Stephen D. Burd, Systems Architecture,1998, Course technology, second edition, 496.*

* cited by examiner

Primary Examiner—Donald Sparks
Assistant Examiner—Ernest Unelus
(74) Attorney, Agent, or Firm—Cantor Colburn LLP

(57) ABSTRACT

A controller and resource management system and method with improved security for independently controlling and managing a computer system is provided. Control, management and security protection is provided while functioning: conceptually, logically, functionally, operatively, physically and electrically independent of computer system resources, including processors. All computer system resources, including processors are operatively dependent on the present invention; processors do not execute operating system instructions. Data transferred between the computer system and processors is communicable through the controller and resource management system for improved security. The present invention comprising: Buffer memory, BIOS, device drivers, event handler, system security, scheduler, memory manager, I//O controller, configuration manager, independent watchdog timer and networking interfaces. One method whereby the invention is implemented in hardware for improved security is provided; another method whereby information is communicable between multiple controller and resource management systems, or micronodes©, independently of computer system resources, including processors is also provided.

8 Claims, 17 Drawing Sheets

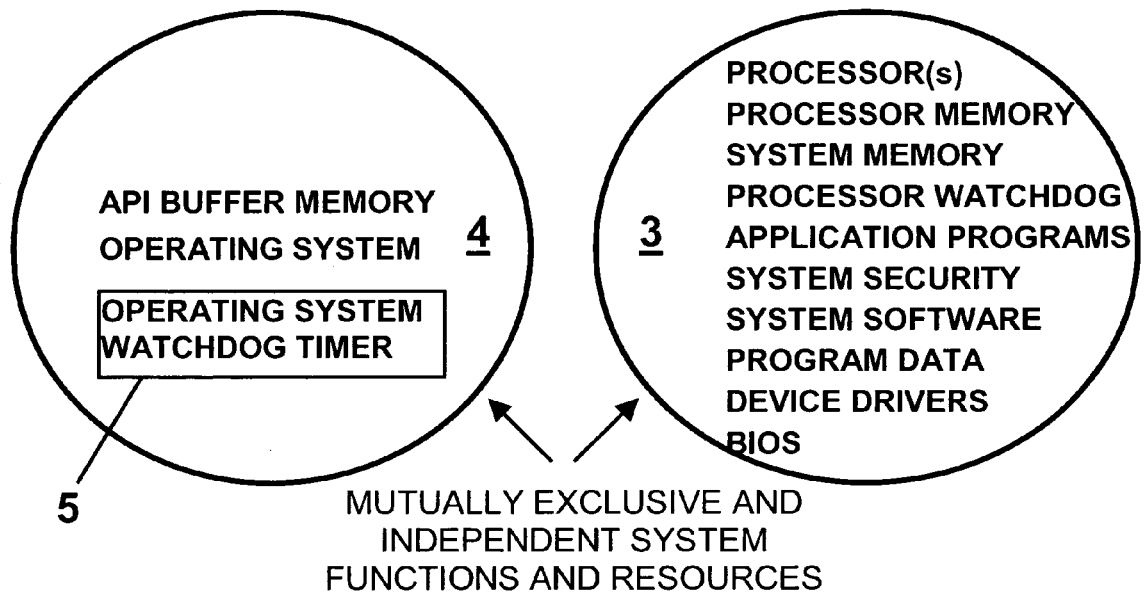
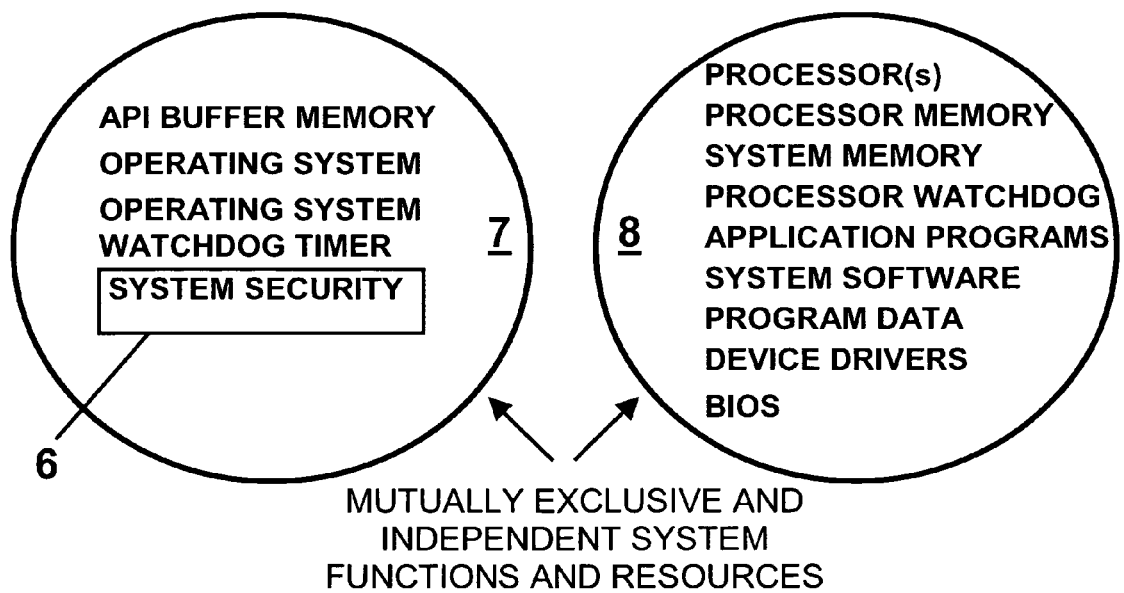

CONTROLLER AND RESOURCE MANAGEMENT SYSTEM AND METHOD WITH IMPROVED SECURITY FOR INDEPENDENTLY CONTROLLING AND MANAGING A COMPUTER SYSTEM

COPYRIGHT NOTICE/PERMISSION

A portion of disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsover. The following notice applies to present invention as described herein and in the drawings herein: Copyright. © 2004, William J. Telesco, All rights Reserved.

BACKGROUND OF INVENTION

This invention relates generally to operating systems and security for computer systems and more specifically to a controller and resource management (CARMS) © system and method with improved security for independently controlling a computer system.

There exists a real and vital need for increased security in computer systems and the operating systems that attempt to control them. The rapid growth in the availability and demand for applications such as business networking, online transactions, email, instant and text messaging, high-performance video, music, real-time playback, content-on-demand and many more applications have placed extreme security demands on the operating system and shared system resources of prior art computer systems. High-speed broadband communications such as DSL, cable, wireless and satellite have led to increases in unauthorized accesses to shared system resources.

Existing computer systems are inherently incapable of providing sufficient security since the operating system that attempts to control and manage the processor exists as processor instructions; instructions that are functionally and operationally dependent on the same processor for their existence. The security problem is fundamental: the processor must execute instructions in order for the operating system to exist; the operating system must exist to control the very same processor that executes the instructions that are responsible for its existence . . . and round and round goes. This invention addresses the fundamental security problems that are responsible for data corruption in existing systems by presenting a new paradigm for computer systems: computer systems with an independently functioning and operating controller and resource management system and method, providing vital system-level security for the computer system.

In order to execute processor program instructions, prior art computer systems are operationally and functionally dependent upon shared system resources including: operating system, application program, application program interface (API), API message buffer memory, device drivers and anti-virus/anti-hacker/anti-spam instructions. Prior art computer systems cannot separate the function and operation of the processor and operating system since both are mutually dependent upon each other in order to remain functionally operational.

Prior art systems are limited in their ability to identify and prevent unauthorized access and corruption of the shared system resources since the processor, memory and operating system are operatively and functionally linked together. Sharing system memory leaves prior art systems vulnerable to unauthorized accesses into application programs and operating system instructions. These unauthorized accesses lead to application errors, operating system instability, system lockups or persistent corruption of system resources. Furthermore, prior art operating systems and processors provide mutual and binding control over each other; the operating system attempts to control the processor, while the processor executes operating system instructions necessary for the operating system to control the very same processor. Problems are inevitable since the operating system and processor actually control each other; those skilled in the art will recognize that prior art operating systems do not independently provide control over the processor since it is impossible for the operating system to operate without having the processor execute instructions necessary for the operating system to exist; the processor must execute software to allow the operating system to attempt to control the very same processor, all the while sharing the same memory space.

Prior art operating systems and computer systems are typically provided with a single watchdog timer to monitor the health and operation of both the processor and operating system. Since both are mutually dependent on one another for their function and operation, adding a second watchdog timer will provide only marginal benefits. The present invention adds a second independent watchdog timer in addition to the watchdog timer used in prior art. Prior art watchdog timers are used for monitoring the health and operation of the processor whereas the present watchdog timer is used specifically for the purposes of monitoring the health and operation of the present invention controller and resource management system. This watchdog timer operates physically, functionally and operationally independent of the prior art watchdog timer used to monitor the health and operation of the processor.

Prior art computer systems use the processor to execute application programs in order to provide the messaging and higher-layer communication necessary for communicating between local or remote computer systems. The present invention allows direct and independent communication between separate present invention controllers and resource management systems via local or remote networking; the processors are not required to be networked together since the present invention controllers and resource management systems themselves are now directly networked together; locally and remotely.

Prior art operating systems and computer systems require the processor and processor memory to allocate a portion of their operational and functional resources, as well as a portion of their physical resources and memory space to the task of executing operating system instructions. The present invention relieves the processor and processor memory of this task since the present invention controller and resource management system now operates conceptually, physically, functionally and operationally independent of the processor and processor memory. The processor and processor memory are provided with increased resources and memory space allowing for an increase in overall computer system performance.

SUMMARY OF THE INVENTION

Prior art operating systems and computer systems require the processor, processor memory and operating system to be physically, operatively, functionally and electrically coupled together, whereas the present invention controller and resource management system operates conceptually, physically, operatively, functionally and electrically independent of the processor, processor memory and processor program instructions. Prior art computing systems make it difficult to determine whether or not the operating system is controlling the processor or if the processor is controlling the operating system; in reality, both processor and operating system are mutually dependent on each other for functional operation. Those skilled in the art will recognize that the present invention provides the means for conceptually, physically, operatively, functionally and electrically independently controlling and managing all computer system resources, including the processor. The present invention controller and resource management system becomes the centralized controlling and managing function for the entire computer system, including processor and shared system memory. Whereas prior art computer systems regarded the processor as the central processing unit (CPU), the present invention provides independent control over the processor, handling it like any other decentralized resource within the computer system. The computer system is now fully capable of performing certain tasks such as interfacing with users of the system and communicating between a plurality of computer systems independently of the processor and processor program instructions.

The present invention provides increased reliability, stability and security protection over prior art since the controlling function (present invention controller and resource management system) for the entire computer system has been physically, operatively, functionally and electrically separated from the processor and application program memory. This provides a more stable, reliable and secure environment for the controller and resource management system, processor, application programs and entire computer system while also providing the processor and processor memory with increased resources and memory space, allowing them to provide an increase in overall computer system performance. The present invention provides a new paradigm for operating systems, computer systems and communicating between systems by physically, functionally, operationally and electrically separating the present invention controller and resource management system from the processor, processor memory and application programs.

Prior art computer systems use their shared processor memory for executing a plurality of processor program instructions including: operating system, application program, application program interface (API) and API message buffer instructions, device drivers as well as tasks specific to providing security protection such as anti-virus, anti-spam and anti-hacker programs. The present invention provides a controller and resource management system having the functional equivalent of prior art software-based operating systems without requiring the processor to execute instructions necessary for the controlling and managing system to function. The only instructions the processor must execute are those related to the task of communicating with the controller and resource management system via the bi-directional application program interface (API) messaging buffer memory. The API buffer memory and messaging queues used for communication between processor and controller and resource management system are now located in the controller and resource management system and are no longer located in shared processor memory as in prior art computer systems.

Prior art operating systems and computer systems require the processor and processor memory to allocated a portion of their operational and functional resources, as well as a portion of their physical resources and memory space to the task of executing operating system instructions. The present invention relieves the processor and processor memory of this task since the present invention controller and resource management system now operates physically, functionally and operationally independent of the processor and processor memory. The processor and processor memory are provided with increased resources and memory space that allow them to provide an increase in overall computer system performance.

In one embodiment the present invention controller and resource management system provides functions for interfacing with a plurality of bi-directional serial data Input/Outputs (I/Os) for interfacing a plurality of external I/Os to the computer system; a subset of these I/Os are used to provide direct and independent communication between separate controllers and resource management systems via local or remote networks. Since the controller and resource management systems themselves are now locally and remotely networked together, the processors are free to dedicate their bandwidth to application programs-resulting in increased performance. In addition, a second watchdog timer is provided specifically for monitoring the health and operation of the present invention controller and resource management system. This watchdog timer operates physically and operationally independent of the prior art watchdog timer used to monitor the health and operation of the processor.

In another embodiment the present invention controller and resource management system includes functions for configuring the computer system, interfacing to computer system devices via device drivers, booting the computer system and a function for secure processing of the bi-directional serial Input/Output (I/Os) of the computer system. In an alternate embodiment the present invention controller and resource management system is implemented in hardware demonstrated in three examples including: time division multiplexing (TDM), simple state machine and an implementation consisting of a weighted round-robin embodiment. Those skilled in the art having the benefit of these implementation descriptions will be able to construct a controller and resource management system with improved security for independently controlling a computer system. Those skilled in the art will recognize that other implementations exist.

Advantages

The present invention has a number of significant advantages and improvements over prior art operating systems and computer systems.

Prior art computer systems require the operating system, application program interface (API) buffer memory and computer system security to operate conceptually, physically, functionally, operationally and electrically dependent on the centralized processor, processor memory, processor watchdog timer, processor software application programs and program data. The present invention provides a computer system wherein the controller and resource management system, application program interface (API) buffer memory, additional controller and resource management system watchdog timer and computer system security provide centralized computer system functions that operate mutually exclusive and conceptually, physically, functionally, operationally and electrically independent of the now decentralized processor and its associated software.

Prior art operating systems are implemented in software as program instructions executed by the processor out of memory that is shared with: general application programs, data storage, application program interface (API) instructions, API buffer memory, BIOS and device drivers and also security protection such as anti-virus/anti-hacker/anti-spam programs. Sharing processor and memory leaves the operating system unprotected and susceptible to corruption and other problems caused by unauthorized access to the shared memory space. The present invention solves these problems by protecting the controller and resource management system from application programming errors and unauthorized access to shared memory space since the operating system no longer resides in the same memory as the application programs. Reliability, stability and security are improved over prior art since the controlling function (controller and resource management system) for the computer system has been conceptually, physically, functionally, operationally and electrically separated from the processor, processor memory and application programs. Another embodiment is presented wherein the controller and resource management system is implemented in hardware devices for providing increased security over prior art software operating systems since the controlling function (controller and resource management system) cannot be corrupted by application programming errors or unauthorized access into shared processor memory; prior art operating systems and application programs are routinely corrupted in this manner.

Prior art computer systems cannot electrically isolate their operating system from the processor or shared memory since the physical and electrical bond is inherent in the design (the operating system is actually instructions executed by the processor in shared memory). Electrical disturbances or failures in the processor, computer system or other functions will mutually affect the operating system. In one embodiment, the present invention solves this problem by implementing all interfaces between the controller and resource management system and computer system via bi-directional optical paths whereby the controller and resource management system operates electrically independent and electrically isolated from the processor and all computer system functions. This method provides electrical isolation between the processor, computer system and the controlling function (controller and resource management system) system. This provides increased security protection over prior art since the controller and resource management system is now electrically isolated and immune from mutual electrical disturbances and failures. This also allows for a plurality of processors or computer systems to securely communicate and interoperate via an electrically isolated controller and resource management system.

Prior art computer systems implement application program interfaces (APIs) buffer memory in shared memory space. This leaves the buffers unprotected and susceptible to corruption and other problems caused by application programming errors and unauthorized access to shared processor memory space. The present invention solves these problems by protecting the controller and resource management system and API buffer memory from application programming errors and unauthorized access to shared memory space since the controller and resource management system and API buffer memory no longer reside in shared memory. The API buffer memory and messaging queues used for communication between processor and prior art operating systems are located in the independent controller and resource management system and not in shared memory. This provides increased reliability, stability and security protection over prior art since the controlling function (controller and resource management system) and the API buffer memory have been conceptually, physically, functionally, operationally and electrically separated from the shared memory and application programs. In addition, another embodiment is presented wherein the controller and resource management system and these functions are implemented in hardware devices, providing even greater security.

Prior art computer systems route the computer system interrupts and events generated by the plurality of computer systems resources to the processor. Prior art processors receive an interrupt or event, save their status and then context switch to another process via an interrupt service routine (ISR) and software operating system. This leaves the computer system, processor, software operating system and application software unprotected and susceptible to corruption. The present invention solves this problem by first routing the interrupts and events through the present invention controller and management system prior to coupling to the processor. All interrupts and events are therefore forced to go thru the present invention system security function providing improved system security over prior art computer systems.

The present controller and resource management system requires less frequent and less intrusive updating than prior art operating systems. The present invention is updated by reprogramming the hardware whereas prior art computer systems must download new software into shared memory with the processor executing download instructions in memory that is shared by application programs. The present invention provides increased security over prior art since the updates to the controller and resource management system and security software cannot be altered by unauthorized access or corrupted by application programming errors. The process of updating programs is less intrusive than updating prior art programs in shared processor memory and is also less frequent due to the inherent reliability, stability and protection offered by the implementation of the present controller and resource management system in upgradeable hardware.

The performance of application programs is increased since the processor has more available bandwidth now that it is no longer involved in executing operating system instructions. Processor bandwidth and resources are now available for other tasks not normally associated with the executing of operating system program instructions. Those skilled in the art will recognize that processor memory space is conserved and bandwidth is increased since the application programs are no longer required to share their memory with the operating system program instructions as in prior art computer systems.

The performance of application programs can be increased by providing the ability to dynamically download one of at least three different controller and resource management system depending on the applications to be executed by the processor. A particular application may perform better using the state-machine version of the controller and resource management system while another application may exhibit better performance using the time division multiplexed (TDM) or weighted round-robin versions. Those skilled in the art will recognize that other implementations may exist including a combination of the three implementations mentioned above.

The descriptions herein are exemplary rather than limiting in nature. Variations and modifications to the disclosed examples may become apparent to those skilled in the art that do not necessarily depart from the essence of this invention. The scope of legal protection given to this invention can only be determined by studying the claims herein.

OBJECTS OF THE INVENTION

It is an object of the invention to provide a controller and resource management system and method with improved security for independently controlling a computer system.

It is an object of the invention to provide a controller and resource management system and method with improved security for independently controlling a computer system wherein the processor, processor memory and computer system software are functioning operatively dependent on the present invention.

It is an object of the invention to provide a controller and resource management system and method with improved security for independently controlling a computer system wherein the processor, processor memory and computer system software are functionally dependent on the present invention.

It is an object of the invention to provide a controller and resource management system and method with improved security for independently controlling a computer system wherein the processor is controlled and managed by the operatively independent present invention.

It is an object of the invention to provide a controller and resource management system and method with improved security for independently controlling a computer system wherein the present invention is functioning conceptually independent of the processor, processor memory and computer system software.

It is an object of the invention to provide a controller and resource management system and method with improved security for independently controlling a computer system wherein the present invention is functioning logically independent of the processor, processor memory and computer system software.

It is an object of the invention to provide a controller and resource management system and method with improved security for independently controlling a computer system wherein the present invention is functionally independent of the processor, processor memory and computer system software.

It is an object of the invention to provide a controller and resource management system and method with improved security for independently controlling a computer system wherein the present invention is functioning operatively independent of the processor, processor memory and computer system software.

It is an object of the invention in certain embodiments herein to provide a controller and resource management system and method with improved security for independently controlling a computer system wherein the present invention is functioning physically independent of the processor, processor memory and computer system software.

It is an object of the invention in certain embodiments herein to provide a controller and resource management system and method with improved security for independently controlling a computer system wherein the present invention is functioning electrically independent of the processor, processor memory and computer system software.

It is an object of the invention to provide a controller and resource management system and method with improved security for independently controlling a computer system wherein the controller and resource management system comprises at least: one event manager, one manager/scheduler, bidirectional application program interface (API) buffer memory, a bidirectional processor interface to the API buffer memory and at least one bidirectional interface for the computer system.

It is an object of the invention to provide a controller and resource management system and method with improved security for independently controlling a computer system wherein the controller and resource management system and processor are communicably coupled.

It is an object of the invention to provide a controller and resource management system and method with improved security for independently controlling a computer system wherein the controller and resource management system is implemented in hardware or firmware.

It is an object of the invention to provide a controller and resource management system and method with improved security for independently controlling a computer system wherein all processor data including application programs, application program interface (API) messaging and user data are communicably transferred through the operationally independent present invention controller and resource management system for the purposes of providing improved security for the computer system.

It is an object of the invention to provide a controller and resource management system and method with improved security for independently controlling a computer system wherein a plurality of controller and resource management systems within a single computer system can be operatively and communicably coupled together independently of the processors, processor memory and computer system software.

It is an object of the invention to provide a controller and resource management system and method with improved security for independently controlling a computer system wherein a plurality of controller and resource management systems residing in separate computer systems can be operatively and communicably coupled together via local area networks (LANs) or wide area networks (WANs) independently of the processors, processor memory and computer system software.

It is an object of the invention to provide a controller and resource management system and method with improved security for independently controlling a computer system wherein a plurality of processors, processor memory and computer system software are communicably connected through the present invention controller and resource management system.

It is an object of the invention to provide a controller and resource management system and method with improved security for independently controlling a computer system having security improvements for application programs executed by the processor.

It is an object of the invention to provide a controller and resource management system and method with improved security for independently controlling a computer system having performance improvements for application programs executed by the processor.

It is an object of the invention to provide a controller and resource management system and method with improved security for independently controlling a computer system having functions for: configuring devices, booting the computer system, providing security protection for the computer system, supporting email, supporting instant messaging, supporting internet communications and I/O for the computer system including PCI, disc, audio, video, keyboard and LAN and WAN network connections and data transfers.

It is an object of the invention to provide a controller and resource management system and method with improved security for independently controlling a computer system wherein a second independent watchdog timer is provided for monitoring the health and operation of the controller and resource management system for improved failure detection over prior art computer systems.

It is an object of the invention to provide a controller and resource management system and method with improved security for independently controlling a computer system requiring less frequent updates or patches than prior art It is an object of the invention to provide a controller and resource management system and method with improved security for independently controlling a computer system providing improvements in stability, reliability and security over prior art operating systems.

It is an object of the invention to provide a controller and resource management system and method with improved security for independently controlling a wireless computer system providing improvements in stability, reliability and security over prior art wireless computer systems.

It is on object of the invention to provide a controller and resource management system and method wherein all prior art processor interrupts are routed through the present invention controller and resource management system for providing improvements in stability, reliability and security over prior art computer systems.

Other and further objects of the invention will become apparent with an understanding of the following detailed description of the invention or upon employment of the invention in practice.

BRIEF DESCRIPTION OF THE DRAWINGS

FIG. 3 is a Venn diagram comprising the same functions illustrated in FIG. 2, and also having a watchdog timer; functioning and operating independently of the plurality of computer system resources.

FIG. 4 is a Venn diagram comprising the same functions illustrated in FIG. 3, and also having a system security function; operating and functioning independently of the processor.

DETAILED DESCRIPTION OF THE INVENTION

This invention relates generally to a controller and resource management system and method for computer systems that provides equivalent functionality and increased reliability, stability, security protection and performance over prior art operating systems and prior art computer systems.

Figure 1:
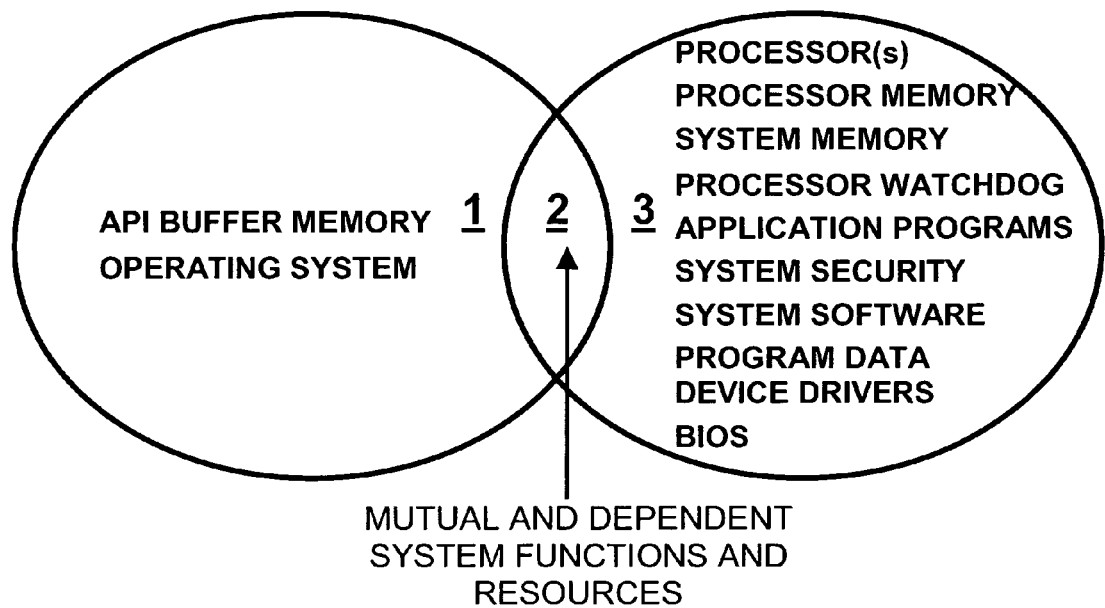
FIG. 1 is a Venn diagram highlighting the (conceptual, logical, functional, operational, physical and electrical) mutually inclusive and dependent plurality of computer system resources and functions within prior art computer systems.

FIG. 1 is a Venn diagram highlighting the (conceptual, logical, functional, operational, physical and electrical) mutually inclusive and dependent functions and resources within prior art computer systems. The Venn diagram clearly illustrates the prior art operating system and API buffer memory 1 functioning and operating mutually inclusive 2 and (conceptually, logically, functionally, operationally, physically, and electrically) dependent on the processors, processor memory and processor program instructions 3. Those skilled in the art will realize that application errors, corruption and unauthorized accesses to these mutually coupled functions and resources routinely lead to mutual and dependent errors, system instability, decreased reliability, decreased security protection and decreased system performance; these undesirable conditions may also lead to persistent system corruption and failures.

Figure 2:
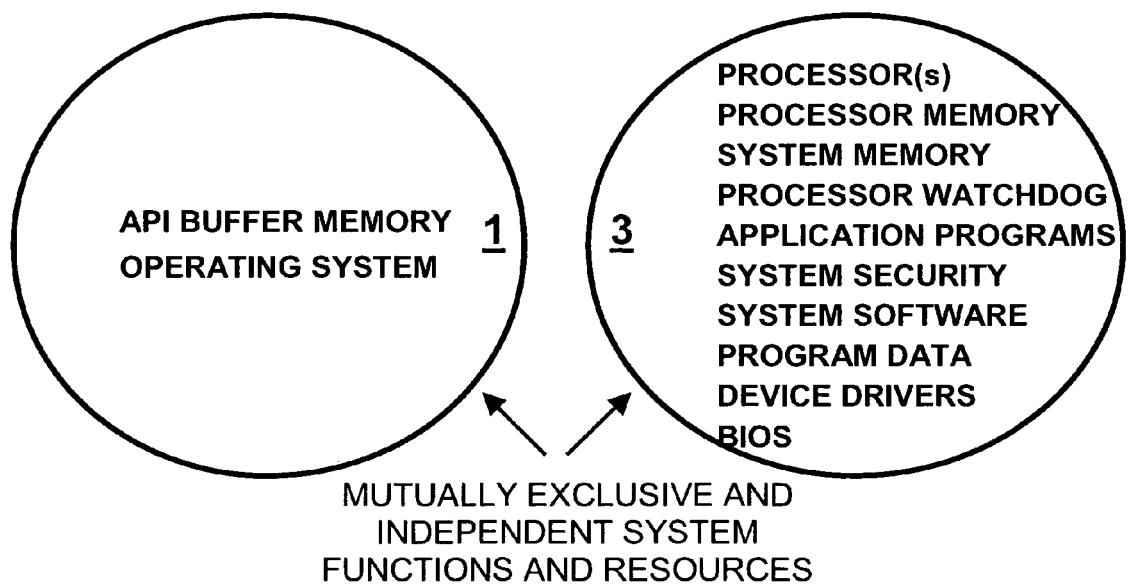
FIG. 2 is a Venn diagram highlighting the (conceptual, logical, functional, operational, physical and electrical) mutually exclusive, operatively and functionally independent controller and resource management system and method of the present invention comprising one embodiment of the present invention.

FIGS. 2–6 are Venn diagrams highlighting the (conceptual, logical, functional, operational, physical and electrical) mutually exclusive and independent functions and resources comprising five embodiments of the present invention. The Venn diagrams clearly illustrate the present invention providing control, management and security protection for the entire computer system; functioning and operating mutually exclusive and (conceptually, logically, functionally, operationally, physically, and electrically) independent of the processors, processor memory and processor program instructions. In FIG. 2 one embodiment of the present invention comprising at least a computer system event handler and computer system manager/resource scheduler and bidirectional application program interface (ABI) buffer memories have been (conceptually, logically, functionally, operationally, physically, and electrically) separated 1 from the processor, processor memory, processor watchdog, application programs, program data, system software, device drivers and BIOS 3. The absence of mutually inclusive region 2 from FIGS. 2–6 clearly illustrates the separation and independence of prior art functions and resources 3, 8 and 13 from present invention function and resources 1, 4, 7, 10 and 12. Those skilled in the art will realize that application errors, memory leaks, viruses, hardware failures, unauthorized accesses and other forms of corruption that affected prior art operating systems and API buffer memories can no longer affect the present invention. One skilled in the art will realize that the aforementioned improvements described for FIG. 2 will also apply to FIGS. 3–6. Additional improvements are provided by the present invention since more system memory is now available for application programs and data storage and the performance of application programs has improved since the processor is no longer required to execute the prior art operating system instructions or security program instructions. The separation of prior art computer system functions and resources provided by the present invention provides increased reliability, stability, security protection and performance over prior art operating systems and computer systems.

FIG. 3 illustrates in Venn diagram format the addition of an independently functioning and operating watchdog timer function 5 provided to independently monitor the health of the present invention. The additional watchdog timer has been provided to reduce the likelihood of common-mode failures within the computer system while increasing the computer system's ability to detect and isolate failures. One skilled in the art will realize that it is impossible to duplicate the present invention watchdog timer in prior art computer systems since prior art operating systems are inherently common-mode systems; it is impossible to conceptually, logically, functionally, operationally, physically, or electrically separate the prior art operating system from the rest of the functions and resources of the prior art computer system shown in the overlapping region 2 of FIG. 1.

A system security function 6 has been added to the present invention in FIG. 4 to independently interrogate system data for signs of unauthorized access attempts by into the computer system. All data coming from, or going to the processor (including program code downloads), will be interrogated and assigned a type identifier label and security level identifier label by this function. Those skilled in the art will realize the improvement gained by checking data before it gets to the processor, processor memory application code, API buffer memory, program data or even the security programs of prior art. Additionally, the present invention provides data verification that is performed by an independent function other than the processor as in prior art systems. This security function also interrogates information from other system I/Os for unauthorized access attempts to the computer system. This function provides the capability to check data in either direction (transmitted out the computer system or received into the system). It can even check for unauthorized accesses via local interfaces such as the keyboard or mouse. The security function also has the ability to verify passwords, verify source addresses, and can even filter out any unauthorized writes into system memory based on a local vs. remote event; for instance the system might only allow writes to memory from a local source such as a secure keyboard.

Figure 5:
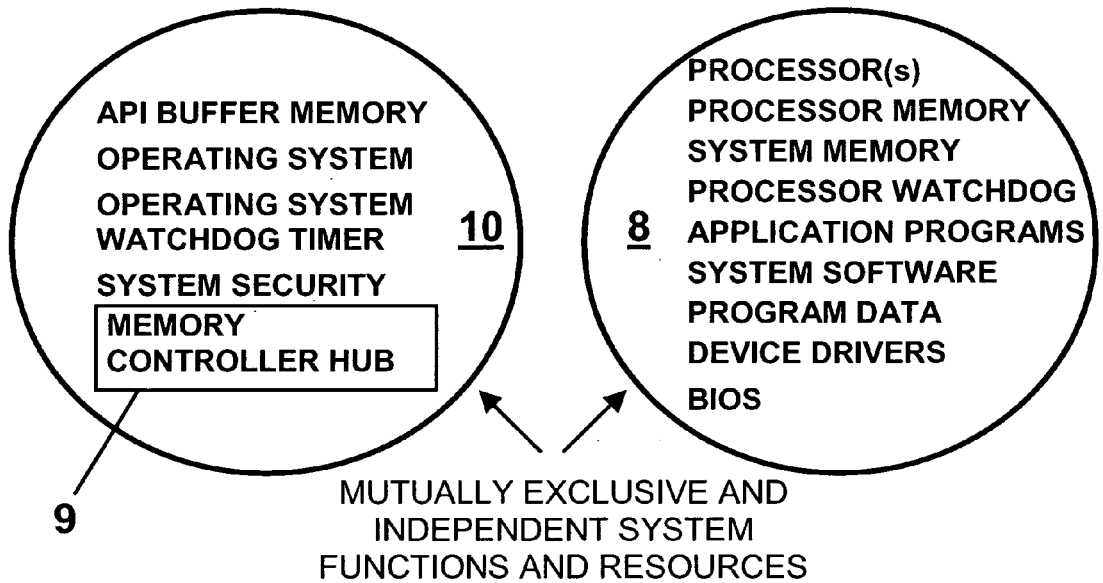
FIG. 5 is a Venn diagram comprising the same functions illustrated in FIG. 4, and also having a memory controller hub function; operating and functioning independently of the processor.
Figure 6:
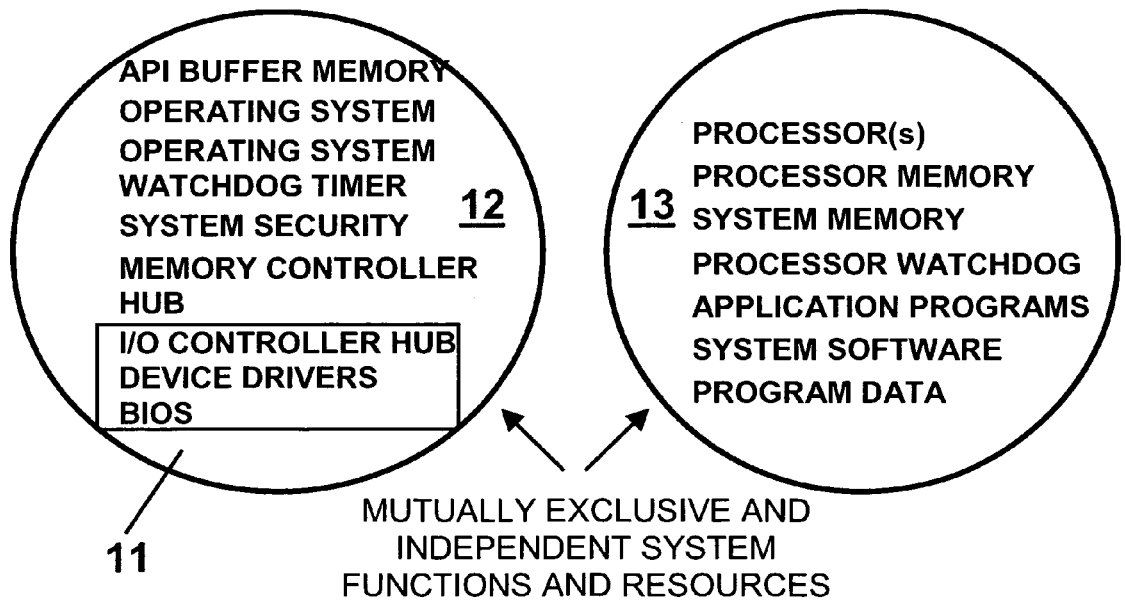
FIG. 6 is a Venn diagram comprising the same functions illustrated in FIG. 5, and also having an I/O controller hub function with device drivers and BIOS; operating and functioning independently of the processor.

FIG. 5 adds a memory controller hub 9; FIG. 6 adds a basic input output system (BIOS) 11 and I/O controller hub 11. The addition of these key functions permits the present invention to interrogate and filter all data coming or going from the computer system. This allows the present invention to check data at any point in the system. The memory controller hub is a key function allowing data coming and going from shared system memory to be interrogated and filtered where most unauthorized accesses and corruption are likely to occur. The I/O controller is an important addition since it allows checking of the computer system inputs for unauthorized access before the data can make its way too deep into the computer system where it can cause more serious problems to the entire computer system. The BIOS will allow flexibility in the booting of the system and device configuration. The entire computer system is more adaptable to security threats and can dynamically alter the configuration of devices depending upon the current or expected security threat level for the system. Those skilled in the art will realize the improvement offered by checking data before it gets too deep into the system as well as checking at shared memory and dynamically adapting to varying levels of security threats.

Figure 7:
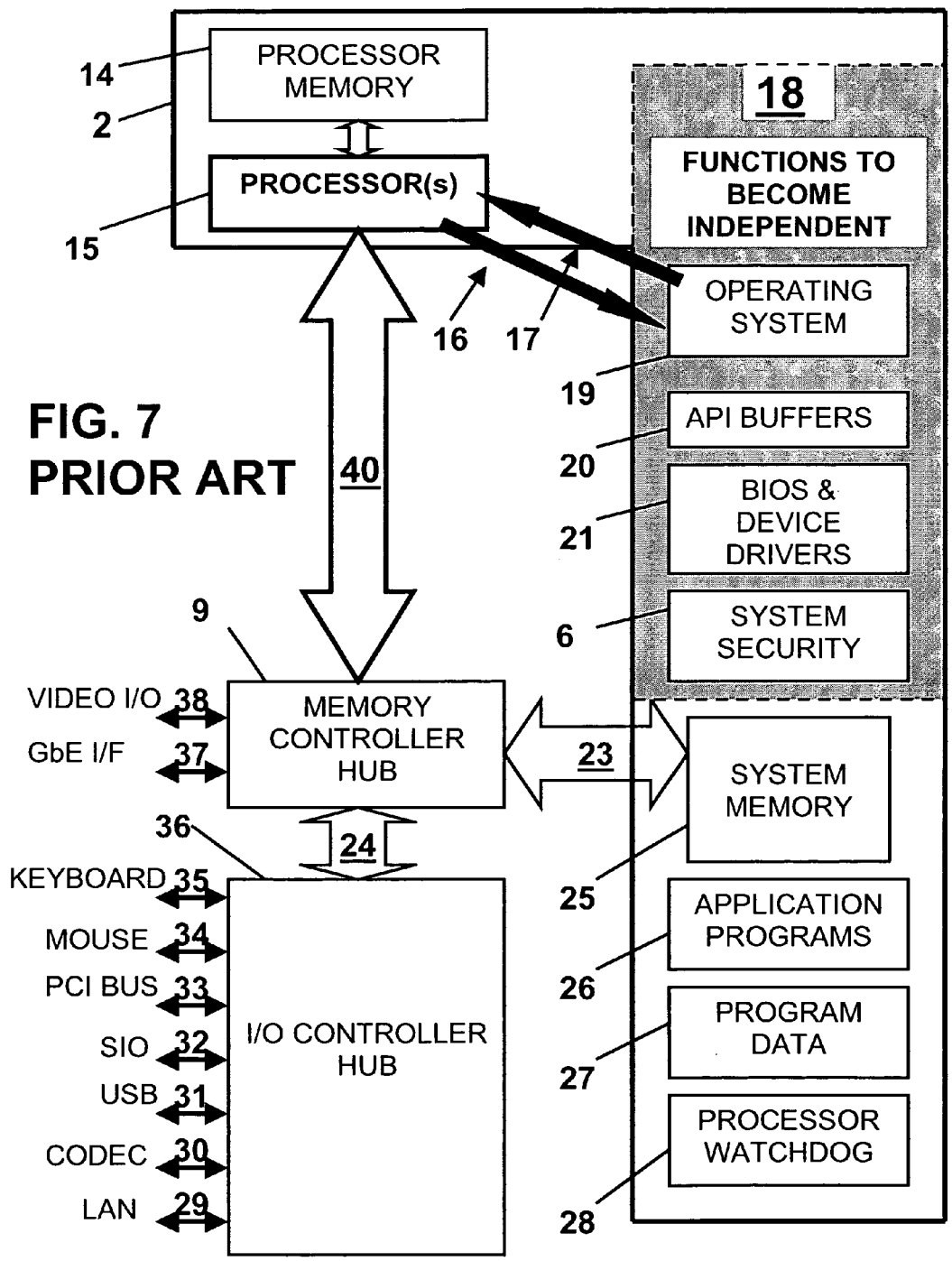
FIG. 7 is a high level block diagram of a computer system that provides the typical operating environment for prior art. This is a block diagram representation of the Venn diagram illustrated in FIG. 1.

Referring to FIG. 7, a high level block diagram of a computer system that provides the typical operating environment for prior art is shown. The computer system consisting of mutual and dependent functions and resources 2 shown as: processor 15, operating system 19, API buffer memory 20, basic input output system (BIOS) with device drivers 21, system security protection 6, processor memory 14, application programs 26, program data 27, processor watchdog timer 28 and shared system bus 23. The functions that will become independent by virtue of incorporation into the present invention 18 are shaded for illustrative purposes only.

At startup the BIOS with device drivers 21 will boot the system and allow the processor 15 to begin loading and executing the prior art operating system 19. Those skilled in the art will realize that the processor is required to load and execute the instructions necessary for the prior art operating system to functionally operate. The processor's control over the prior art operating system is represented by arrow 16. The operating system is therefore dependent on the processor for its functional operation. The operating system, as a well-designed operating system should, attempts to control the processor as represented by arrow 17. Control arrows 16 and 17 help to illustrate the fact that the processor is therefore dependent on the operating system for its functional operation. As illustrated, prior art operating systems 19 used for providing control, management and security protection 22 for the entire computer system are mutually inclusive and conceptually, physically, functionally, operationally and electrically dependent of the processors 15, processor memory 14 and software 25–27. It should be noted that in the next drawing, FIG. 8, control arrow 16 is conspicuously missing; it's no longer needed once the function of the present invention is separated from the prior art processor. Control arrow 17 remains in FIG. 8 since this arrow denotes the independent control that the present invention has over the processor. Even arrow 17 is dropped in later drawings since it's assumed that those skilled in the art will realize that the present invention's control over the processor happens to occur in-band as a result of bi-directional messaging in application program interface (API) path 40. Or alternately via secure interrupts to the processor 100.

Those skilled in the art will recognize that application errors, corruption and unauthorized accesses to these mutually coupled functions and resources 2 routinely lead to mutual and dependent errors, system instability, decreased reliability, decreased security protection and decreased system performance; these undesirable conditions may also lead to persistent system corruption and failures. Also shown are general computer system resources such as the memory controller hub 9 used by the processor and other system resources to arbitrate for access to the shared system bus 23 and shared system resources 2; it is also used for high-speed interconnect of the video I/O 38 and Gigabit Ethernet (GbE) interfaces 37 to the computer system and shared system resources such as bus 23, shared processor and memory 2 and shared PCI bus resources 33. The Input/Output (I/O) controller 36 is used to interface with devices 29–35 consisting of: keyboard, mouse, PCI bus, serial Input/Output (SIO), Universal Serial Bus (USB), voice coders-decoders (CODECs) and Local Area Networks (LANs). Those skilled in the art will realize that the heavily shared systems resources 2, 23, 33 quickly become bottlenecks that decrease system performance.

Figure 8:
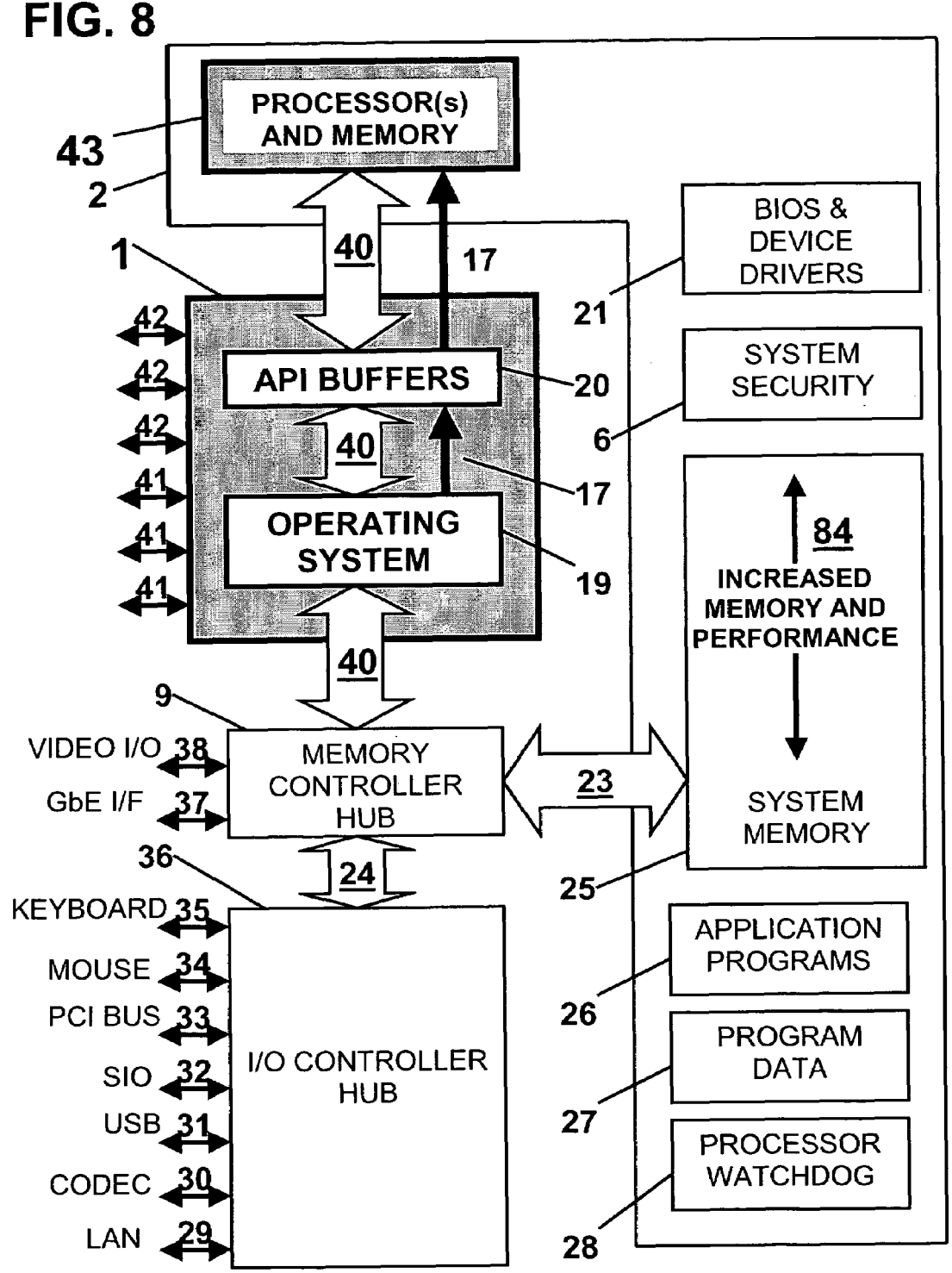
FIG. 8 is a high level block diagram representing a computer system in which some aspects of the present invention are incorporated. This is a block diagram representation of the Venn diagram illustrated in FIG. 2.

Referring to FIG. 8, a high level block diagram representation of the Venn diagram used in FIG. 2 to illustrate the first embodiment of the present invention is presented. The computer system shown consisting of mutual and dependent functions 2 and resources as shown. The separate processor 15 and memory 14 of previous FIG. 7 have been combined in FIG. 8 as 43 to denote the processing function consisting of processor and memory operatively coupled. Also shown are application programs 26, program data 27, processor watchdog timer 28 and shared system bus 23. In the present system, the prior art operating system 19 and application program interface (API) buffer memory 20 have been incorporated into a single functional block 1 representing one embodiment of the present invention. As can be seen from the drawing, the prior art operating system 19 has conceptually, physically, functionally and operationally been separated from the shared system resources 2; these functions now operate independently of the processor and shared system resources 2. At startup the BIOS with device drivers 21 will boot the system and allow the processing function 43 to begin loading and executing application programs 26, without having to first load and execute the prior art operating system instructions as required in prior art computer systems. Those skilled in the art will realize that the processing function is no longer required to load and execute the instructions necessary for the prior art operating system 19 to functionally operate. The processor's control over the operating system has been eliminated (arrow 16 is no longer necessary). The operating system is therefore no longer dependent on the processor for its functional operation. The operating system is now able to independently control the processor as represented by arrow 17. The processor is therefore dependent on the operating system for its functional operation. As illustrated, the present invention 1 provides control and management for the entire computer system and is mutually exclusive and conceptually, physically, functionally and operationally independent of the processing function 43 and software 25–27. Those skilled in the art will recognize that application errors, corruption and unauthorized accesses to these mutually coupled functions and resources 2 cannot affect the stability, reliability, security protection, performance or functional operation of the present invention 1. Another benefit provided by the present invention is the increase in memory space and system performance as depicted by 84.

Also shown in FIG. 8, the path taken 40 by the processor in the prior art block diagram of FIG. 7 has been drastically altered. The processor was able to get at the memory controller hub directly in prior art designs. As can be seen from FIG. 8, the processor is forced to go though the present invention in order to get to the memory controller hub as before. This is denoted by splitting the single arrow 40 of FIG. 7 into three separate arrows 40 depicted in FIG. 8. This is intentional by design since in alternate embodiments the processor will be forced to go through the security function of the present invention. The general computer system resources such as the memory controller hub 9 used by the processor and other system resources to arbitrate for access to the shared system bus 23 and shared system resources 2 are also shown along with high-speed video interconnect 38 and Gigabit Ethernet (GbE) interface 37 and PCI bus resources 33. Interfaces 41 and 42 have been added to the present invention 1. Interfaces 41 are used to operatively and communicably coupling separate present invention controller and resource management system systems together that reside in the same computer system. Interfaces 42 are used to operatively and communicably coupling separate present invention controller and resource management system together that happen to be in separate computer systems. Interfaces 41 and 42 provide the computer systems a means to directly couple present invention controller and resource management system together independent of the processing function. This provides improvements in security and reliability over prior art systems that instead couple the processors together, leaving the entire computer system, processor, prior art operating system and application programs vulnerable to corruption. Since the controlling and managing function for the entire computer system is now independently controlling the entire computer system, it just makes sense to tie the controlling functions together directly rather than going through the processing function. This is impossible to do with prior art systems since the operating system and processing function are mutually dependent functions.

Figure 9:
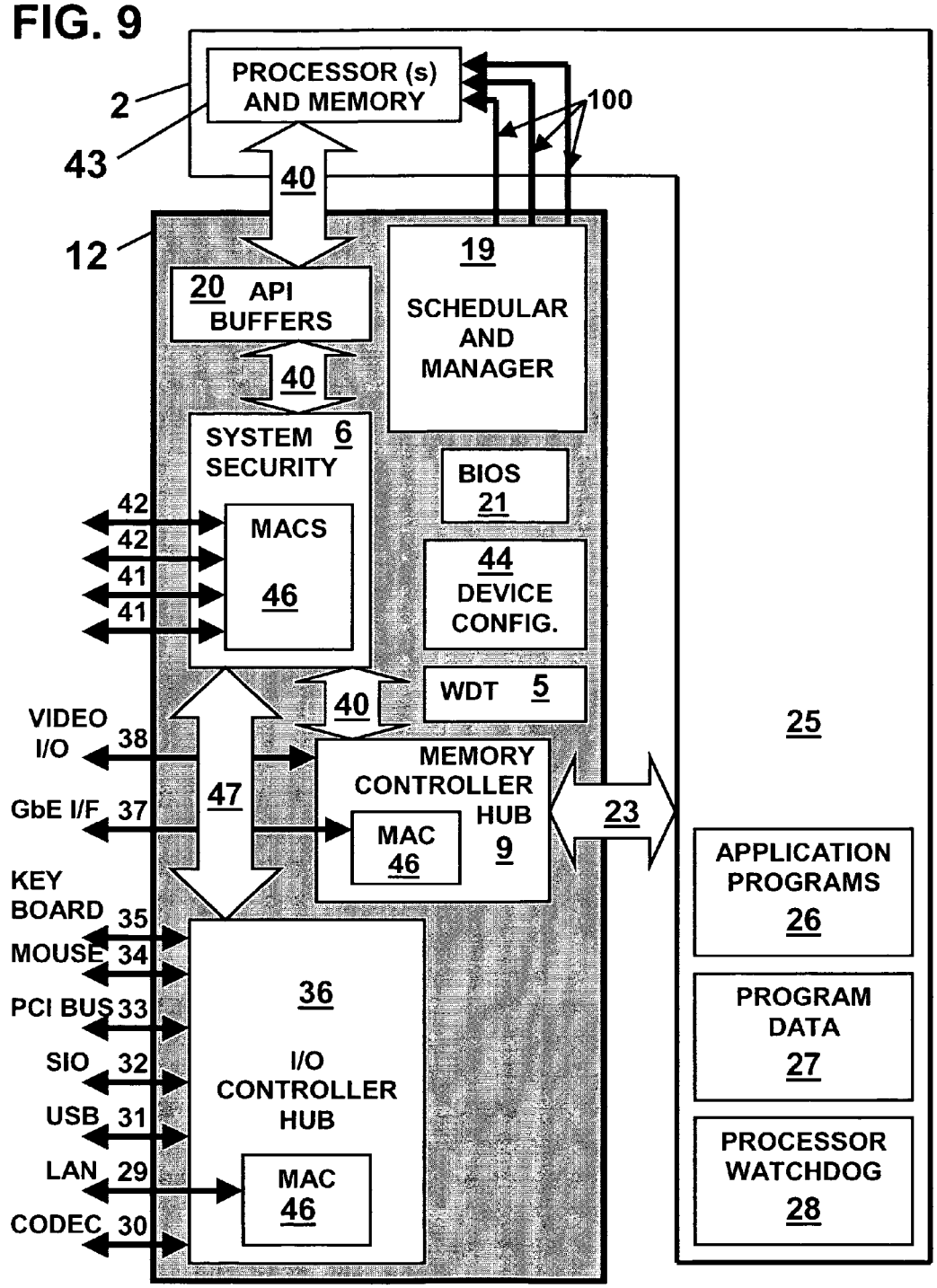
FIG. 9 is a high level block diagram representing the another embodiment of the present invention. This is a block diagram representation of the Venn diagram illustrated in FIG. 6.

FIG. 9 is one embodiment for the present invention showing a high level block diagram representing a computer system in which most aspects of the present invention are incorporated; alternately this block diagram can be used to represent another embodiment of a personal computer system. The computer system consisting of mutual and dependent functions 2 and resources shown as: processing function 43, application programs 26, program data 27, processor watchdog timer 28 and shared system bus 23. In the embodiment 12, the system scheduler and manager 19, API buffer memory 20, basic input output system (BIOS)

with device drivers 21 and system security 6 have been conceptually, physically, functionally and operationally separated from the shared system resources 2; these functions now operate independently of the processor and shared system resources 2. At startup the BIOS and device drivers 21 will boot the system and allow the processing function 43 to begin loading and executing application programs 26, without having to first load and execute operating system instructions as required in prior art computer systems. Those skilled in the art will realize that the processing function is no longer required to load and execute the instructions necessary for the present invention 12 to functionally operate. The processor's control over the operating system has been eliminated. The operating system is no longer dependent on the processor for its functional operation. The present invention controller and resource management system is now able to independently control the processor in-band of the API path as shown by 40, or alternately out-of-band using the secure interrupts 100. The processor is therefore dependent on the present invention controller and resource management system for its functional operation. As illustrated, the present invention 12 with scheduler/manager 19 provides control, management and security for the entire computer system. This function is mutually exclusive and conceptually, physically, functionally and operationally independent of the processing function 43. Those skilled in the art will recognize that application errors, corruption and unauthorized accesses to these mutually coupled functions and resources 2 cannot affect the stability, reliability, security protection, performance or functional operation of the present invention 12. Another benefit provided by the present invention is the increase in memory space and system performance as depicted by 25.

Figure 12:
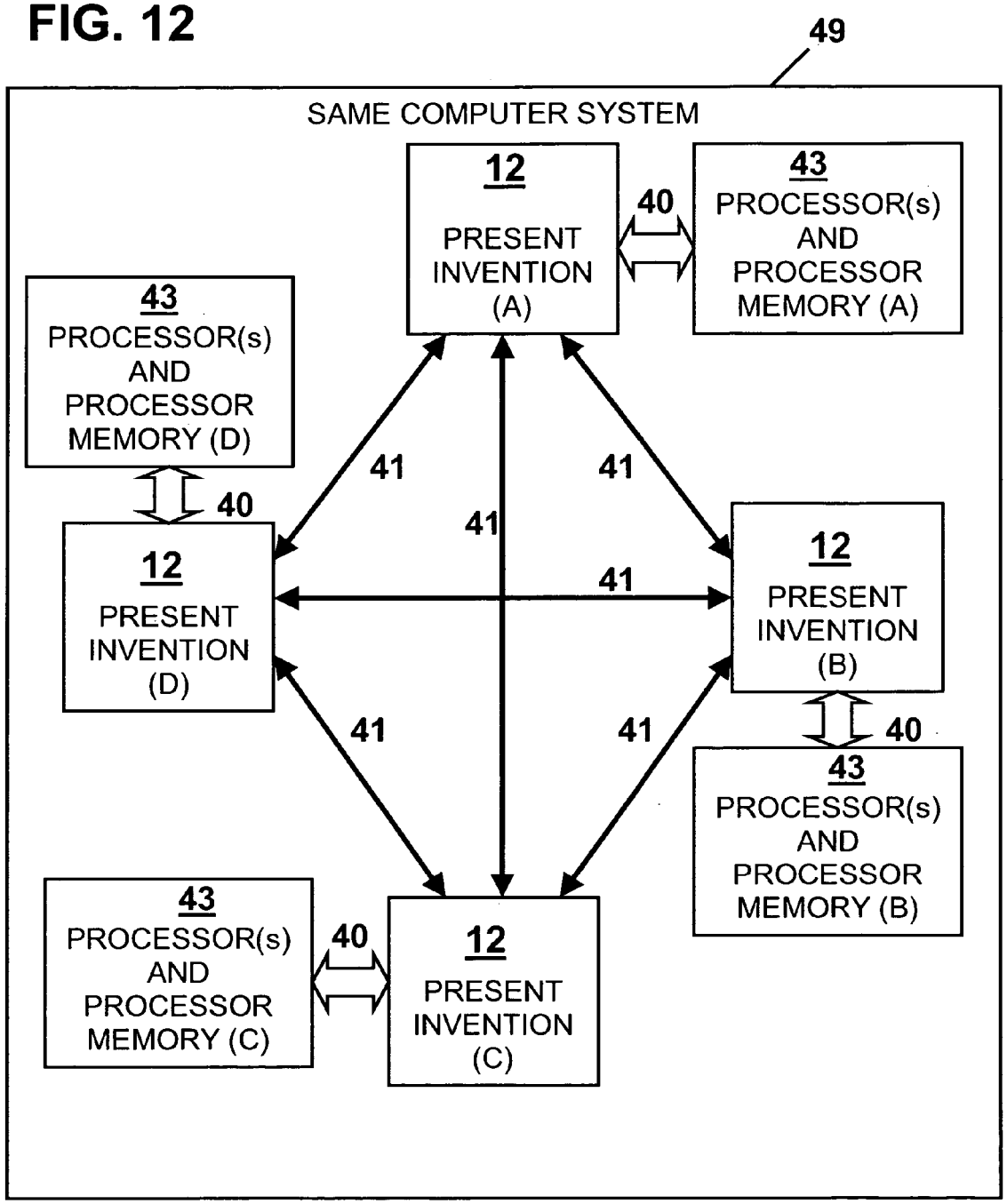
FIG. 12 is a high-level schematic representing a plurality of present inventions and processing functions communicably coupled through the present invention by a full mesh interconnect within the same computer system chassis. This interconnect may be electrical or optical.
Figure 14:
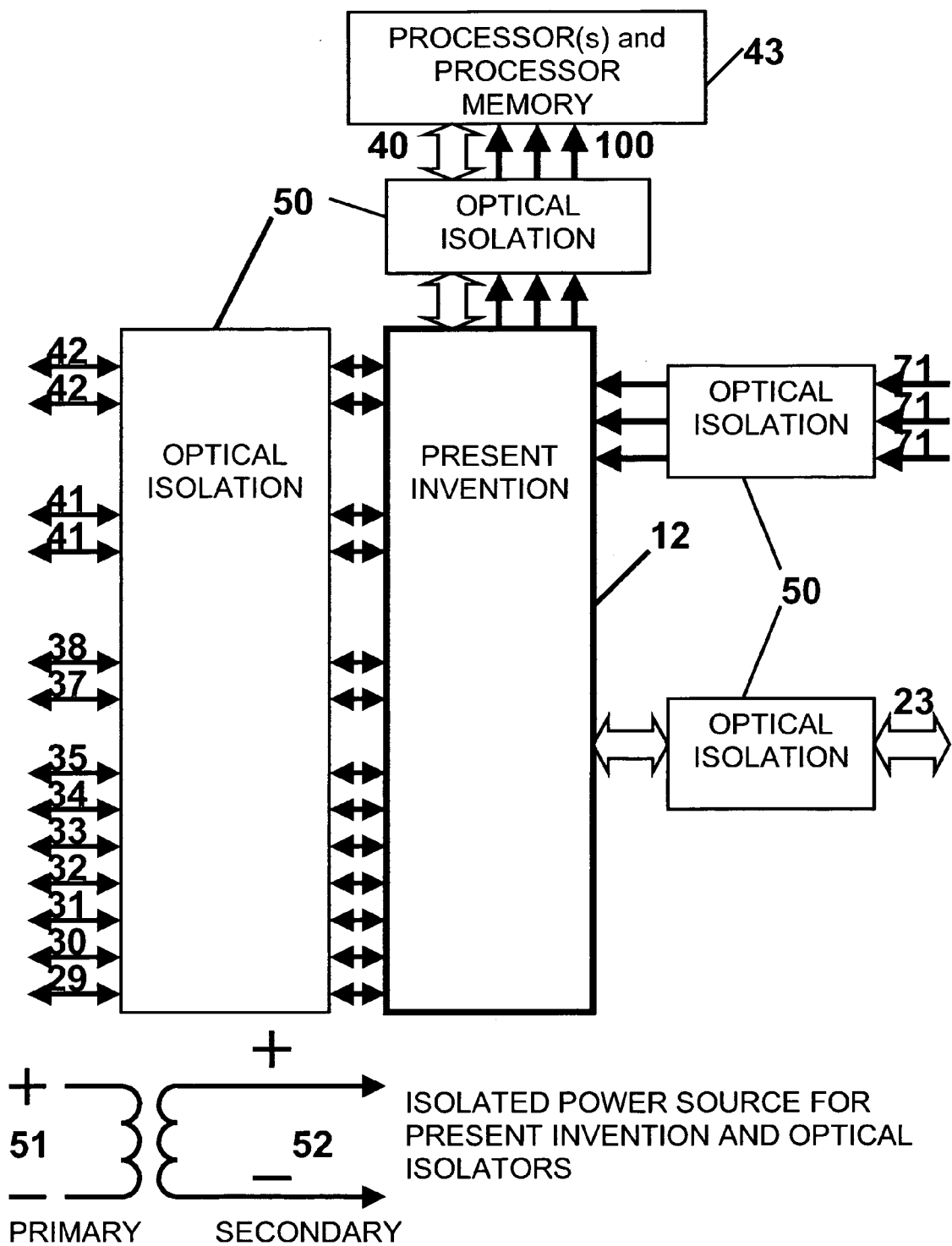
FIG. 14 is a high-level schematic representing a computer system wherein the present invention is electrically isolated from all other system functions and resources.

As also shown in FIG. 9, the present invention 12 incorporates the memory controller hub 9 used in prior art systems to arbitrate for access into shared memory. Also incorporated into the present invention 12 is the Input/Output (I/O) controller 36 used to interface with devices consisting of: keyboard 35, mouse 34, PCI bus 33, serial Input/Output (SIO) 32, Universal Serial Bus (USB) 31, voice coders-decoders (CODECs) 30 and Local Area Networks (LANs) 29. Those skilled in the art will realize that the shared systems resources 2, 23 are no longer bottlenecks that decrease system performance since the functions incorporated by the present invention require far less bandwidth from shared resources since the processor has more memory space and operational bandwidth by virtue of the fact that it is no longer required to execute operating system, BIOS buffer or security code. Incorporating all of the computer system control into the present invention 12 allows those skilled in the art to produce computer systems that are less expensive, consume less power, are smaller, lighter, more reliable, more secure, more stable and higher performance when compared to prior art computer systems. Bi-directional interfaces 41 provide a means for communicating and interoperating with a plurality of controller and resource management systems located within the same computer system as depicted in FIG. 12. Bi-directional interfaces 42 provide a means for communicating and interoperating with a plurality of controller and resource management systems located remotely and networked via local area network (LAN) or wide area network (WAN) networks as depicted in FIG. 14.

Figure 10:
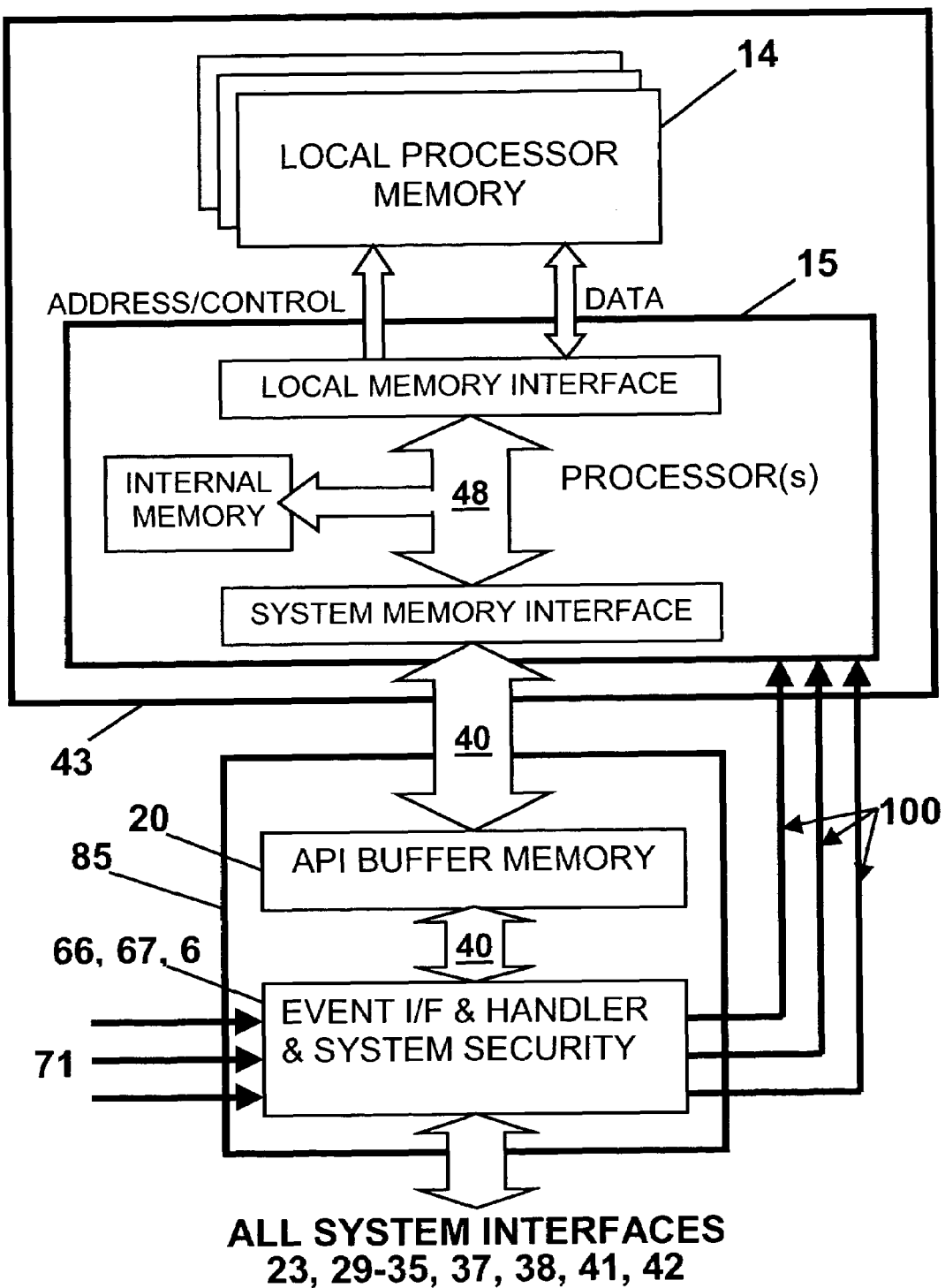
FIG. 10 is a high level block diagram representing another embodiment of the present invention with the computer system having at least one processor coupled to local memory, hereinafter referred to as a processing function.

FIG. 10 shows more detail of processing function 43 comprised of processor 15 and local processor memory 14 are operatively and communicably coupled to the present invention 85 through bidirectional interface 40 and secure interrupts 100. The processor is required to use this path for downloading new code, booting and communicating with the remaining functions and resources of the computer system. Internal data path 48 is shown for completeness assuming most processors have on-board memory. Computer system events 71 will prompt communication between the present invention and the processor through bidirectional interface 40 or secure interrupts 100. Data path 40 is used for both data and in-band messaging by both the processor and present invention. The processor will execute an API call to the present invention as it does for prior art computer systems when the API buffer memory is located in internal or local memory space. The present invention will respond to the processors request for service based on a prioritized scheduling algorithm executing in 19. Alternately the controller and resource management system can send secure interrupts to the processor where the processor will respond by saving context and vectoring to another process via an interrupt service routine (ISR) and the aforementioned API buffer memory. The present invention controller and resource management system treats the processor just like any other resource in the computer system; the processor is no longer in control of the situation. This works out well since the centralized controlling and managing function for the entire computer system should be in control of every interface, every function and every system resource.

Figure 11:
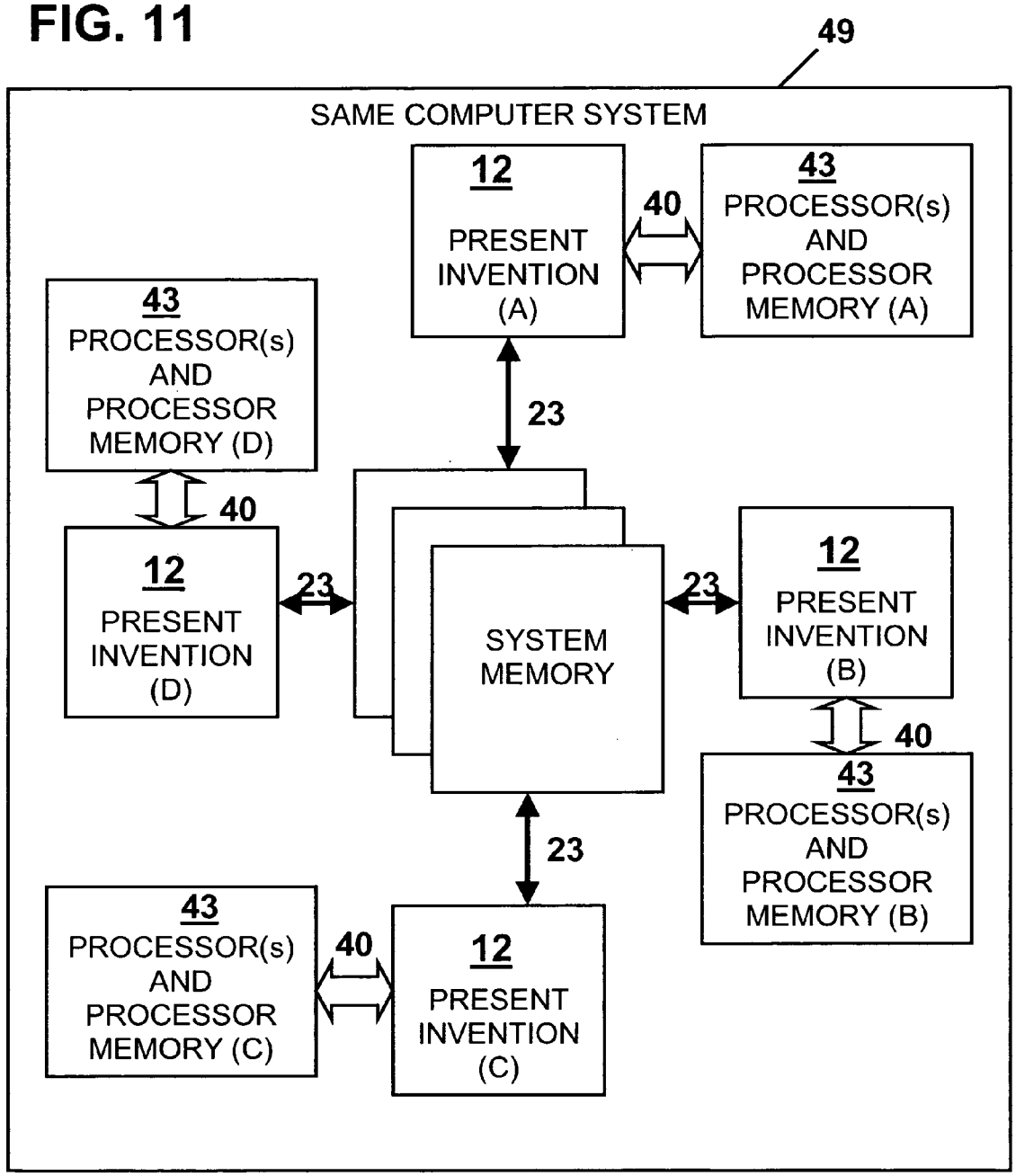
FIG. 11 is a high-level schematic representing a plurality of present inventions within the same computer system chassis, each separately communicably coupled to their own processing function; each separate pair coupled through the present invention to the same shared memory.

FIG. 11 shows a plurality (four in this case) of controller and resource management systems 12 within the same computer system operatively coupled to shared system memory via memory interface 23. The controller and resource management systems 12 are shown coupled to processing functions 43 as depicted previously in FIG. 10. This arrangement is unique since the controller and resource management systems are directly coupled to the shared resource and not the processors as in prior art systems. Since the controlling functions are directly coupled together, all data must pass through the system security function provided by the controller and resource management systems.

Referring to FIG. 12, Bi-directional interfaces 41 provide a means for a plurality of present inventions 12 with to directly communicate and interoperate within the same computer system 49; four controller and resource management systems are shown connected together in a full mesh. Prior art requires the communication and interoperability to occur between processors, not operating systems. Path 41 allows the present invention controller and resource management system to communicate independently of processing function 43. Those skilled in the art will realize the advantages of directly connecting the controlling and managing functions together. The present invention provides a more secure, stable and reliable means of interoperating than prior art. The present invention also provides increased communications and data throughput while exhibiting lower latency in security protection and policy decisions.

Figure 13:
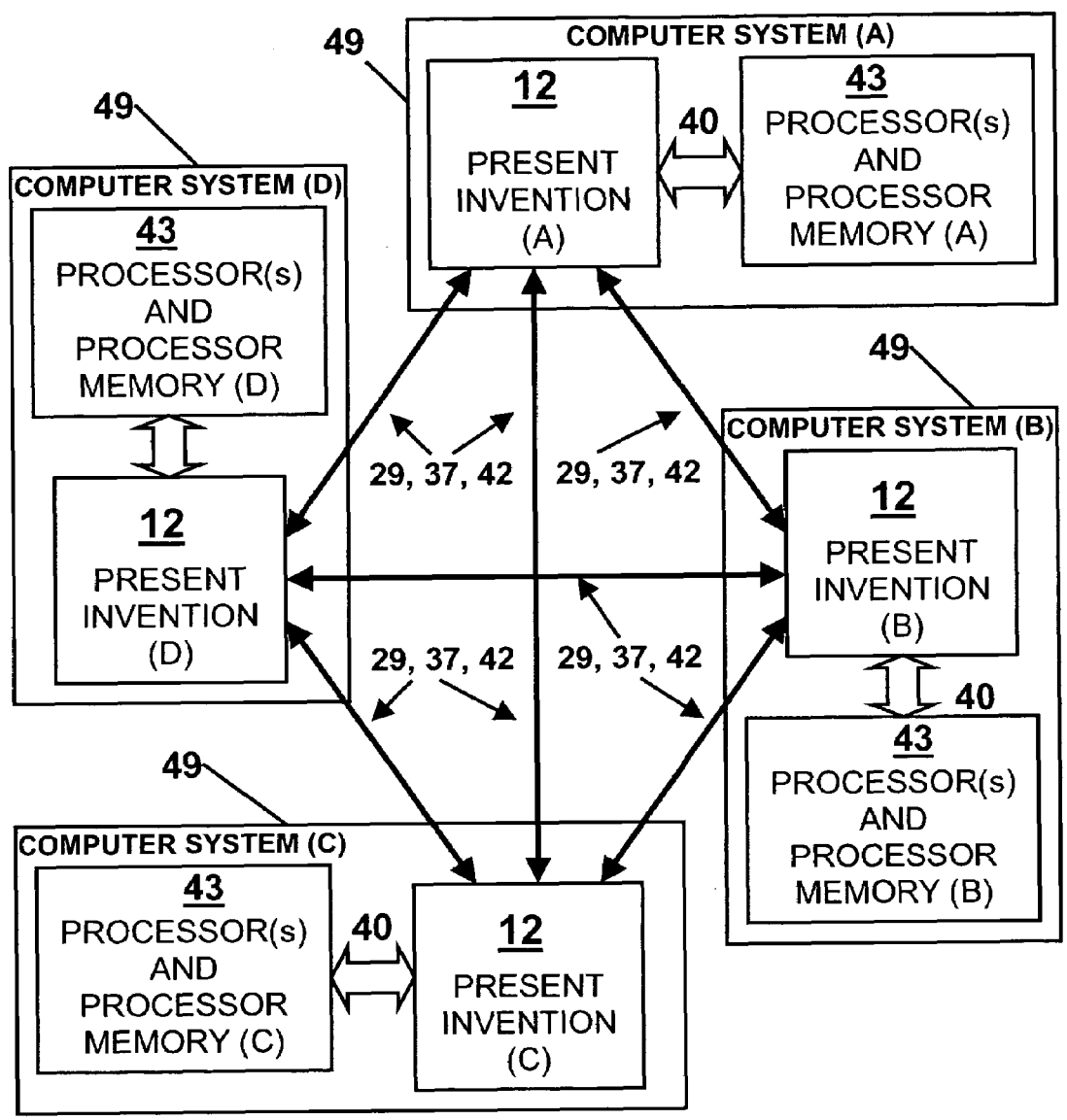
FIG. 13 is a high-level schematic representing a plurality of present inventions, each within their own separate computer system chassis communicably coupled through the present invention by a full mesh local area (LAN) or wide area network (WAN) network.

Referring to FIG. 13, Bi-directional interfaces 42 provide a means for a plurality of present inventions 12, each within their own separate computer system chassis 49 to directly communicate and interoperate via a full mesh local area network (LAN) 29 or wide area network (WAN) 37; four controller and resource management systems 12 are shown connected together in a full mesh. Prior art requires the communication and interoperability to occur between processors, not operating systems. The present invention controller and resource management system independently controls and manages the processor and all computer system functions and resources. Those skilled in the art will realize the advantages of directly connecting the controlling and managing functions together. The present invention provides a more secure, stable and reliable means of interoperating than prior art. The present invention also provides increased communications and data throughput while exhibiting lower latency relative to processing security protection and policy decisions. When the full mesh computer system-to-computer system network of present FIG. 13 is combined with the internal computer system full mesh network of previous FIG. 12, one skilled in the art can only dream of all the various possibilities this unique technology has to offer. These highly intelligent and secure "micronodes©" start to look a lot like their older, but not wiser siblings the "nodes" found in all LAN and WAN networks today. By assigning unique addresses to each micronode©, the combination of a local processing function with an intelligent and secure local controller and resource management system can be treated like any other LAN or WAN node. Entire networks can be created within the confines of an equipment rack due to the rapid increase in device integration. Since certain embodiments of the present invention has optical I/Os in the form of vertical cavity emitting lasers (VCELS), the micronodes© can be optically coupled to other micronodes© or even to remote nodes found in present day LAN and WAN networks. In one embodiment, FIG. 13 represents a plurality of communications computer systems coupled together via a full mesh network.

Referring to FIG. 14, a high-level schematic representing a computer system wherein the present invention 12 is electrically isolated from all other system functions and resources internal and external to the computer system, Including the processor and local processor memory 43. The present invention 12 is powered by the secondary output 52 of a source 51 isolated power supply. The secondary output of this supply 52 is used to exclusively power the present invention 12 and the present invention-side of the optical isolation devices 50. The computer system-side 40, 100, 23, 29–35, 37, 38, 41 and 42 of the isolation devices are powered by a separate computer system power supply that is electrically isolated from secondary output 52 of the present invention power supply. Optical isolation devices 50 provide bi-directional optical transmission and electrical isolation of all signals and data transferred between the present invention and the computer system interfaces: 15, 19, 8, 17, 18, 100 and 20. Those skilled in the art will realize that any additional interface signals required such as additional clocks will also have to be isolated by similar means. By electrically isolating the present invention from the rest of the computer system those skilled in the art can produce a more robust system that is less susceptible to the harmful effects of ESD as well as conducted and radiated EMI. This is one advantage and improvement that prior art systems will never be able to match since the functions that have been incorporated into the present invention are physically and electrically coupled in prior art systems and can never be electrically isolated by prior art systems. The present invention offers a unique solution to these problems that is impossible to duplicate with prior art systems since prior art operating systems are inherently coupled physically and electrically to the processing function.

Figure 15:
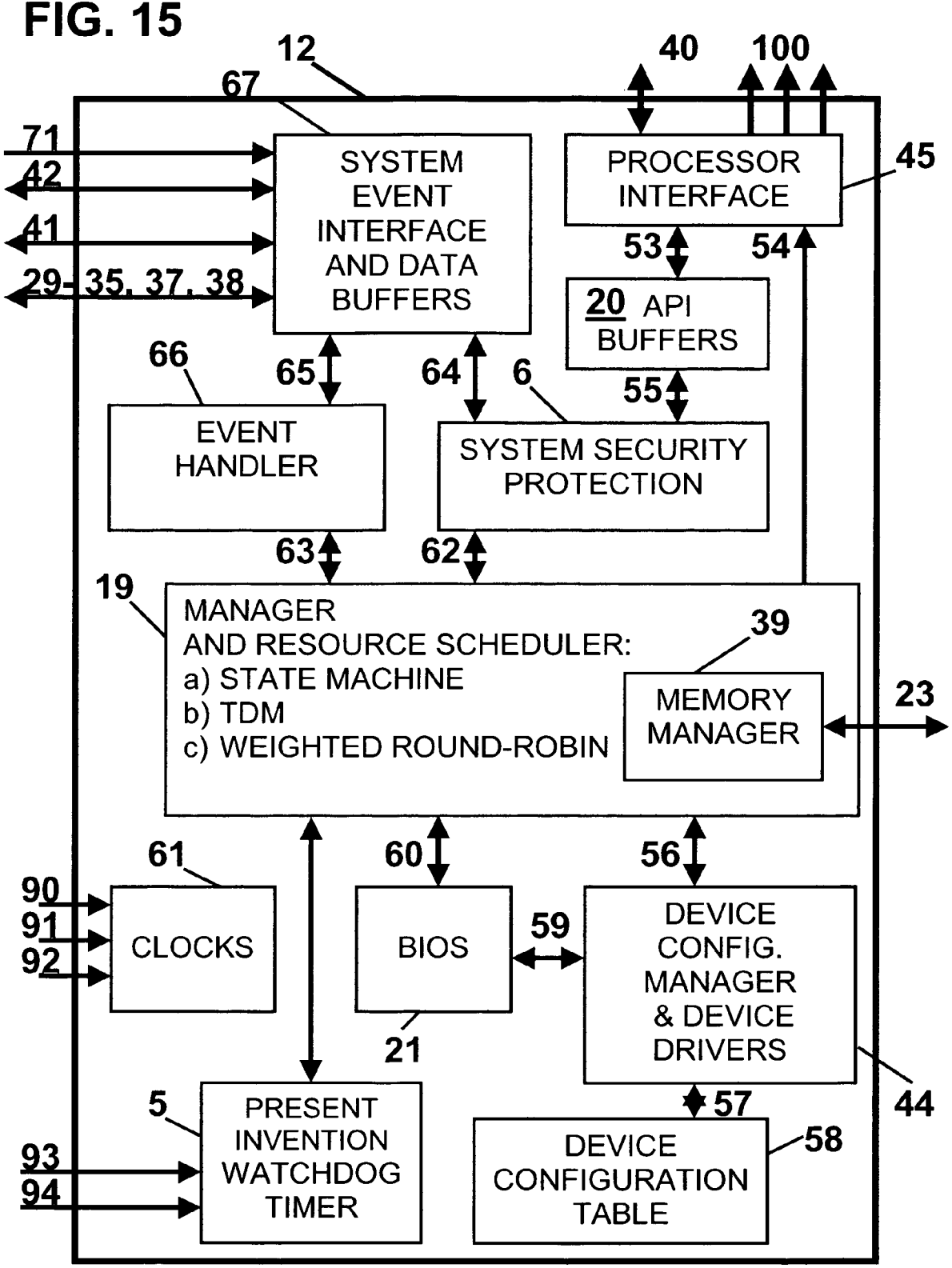
FIG. 15 is a high level block diagram representing one embodiment for the present invention.
Figure 16:
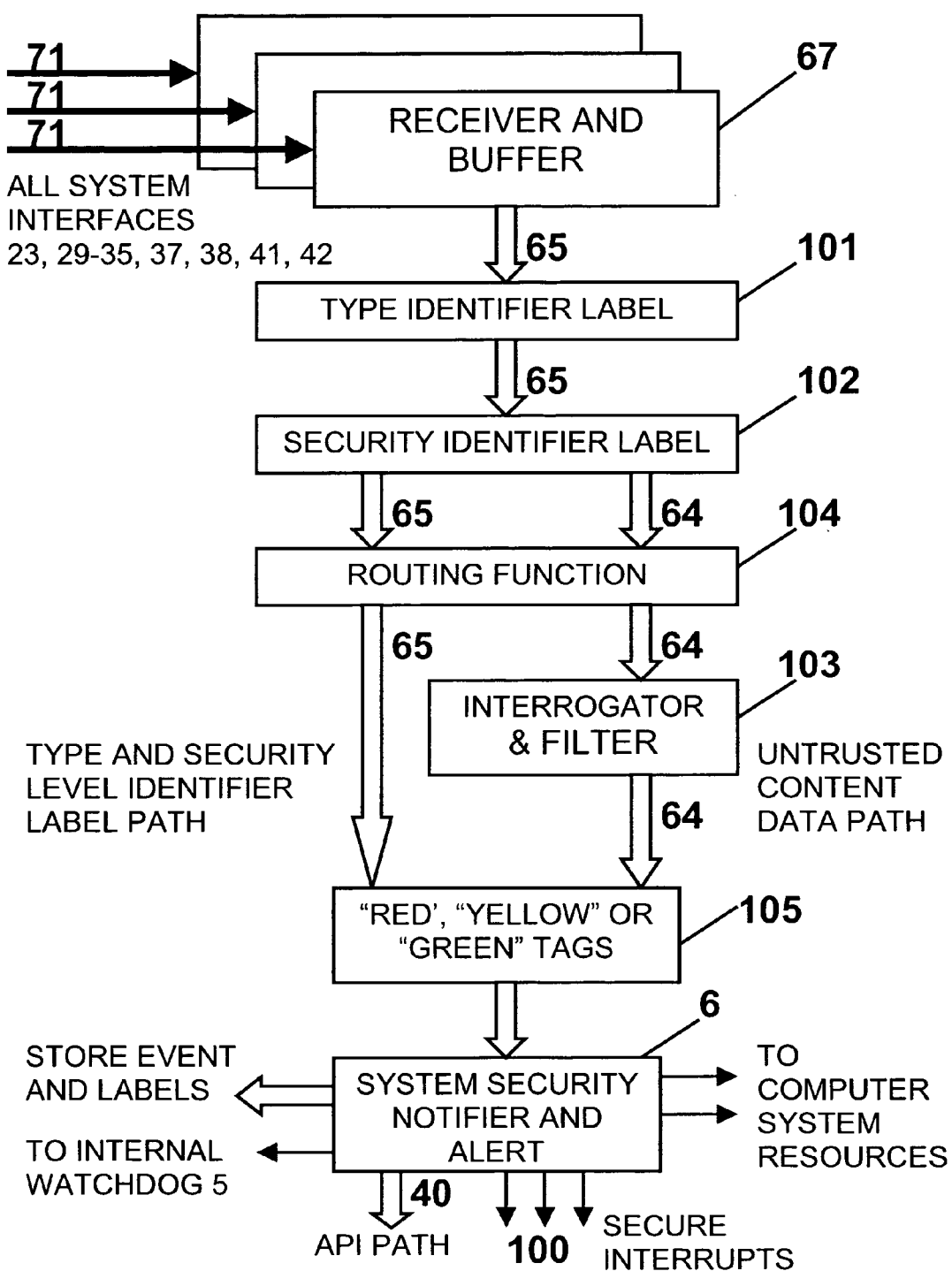
FIG. 16 Shows in more detail the communication and data path taken through the present invention starting with computer system events, through the event handler, then through the system security function and finally to the notification and alerting of computer system resources.
Figure 17:
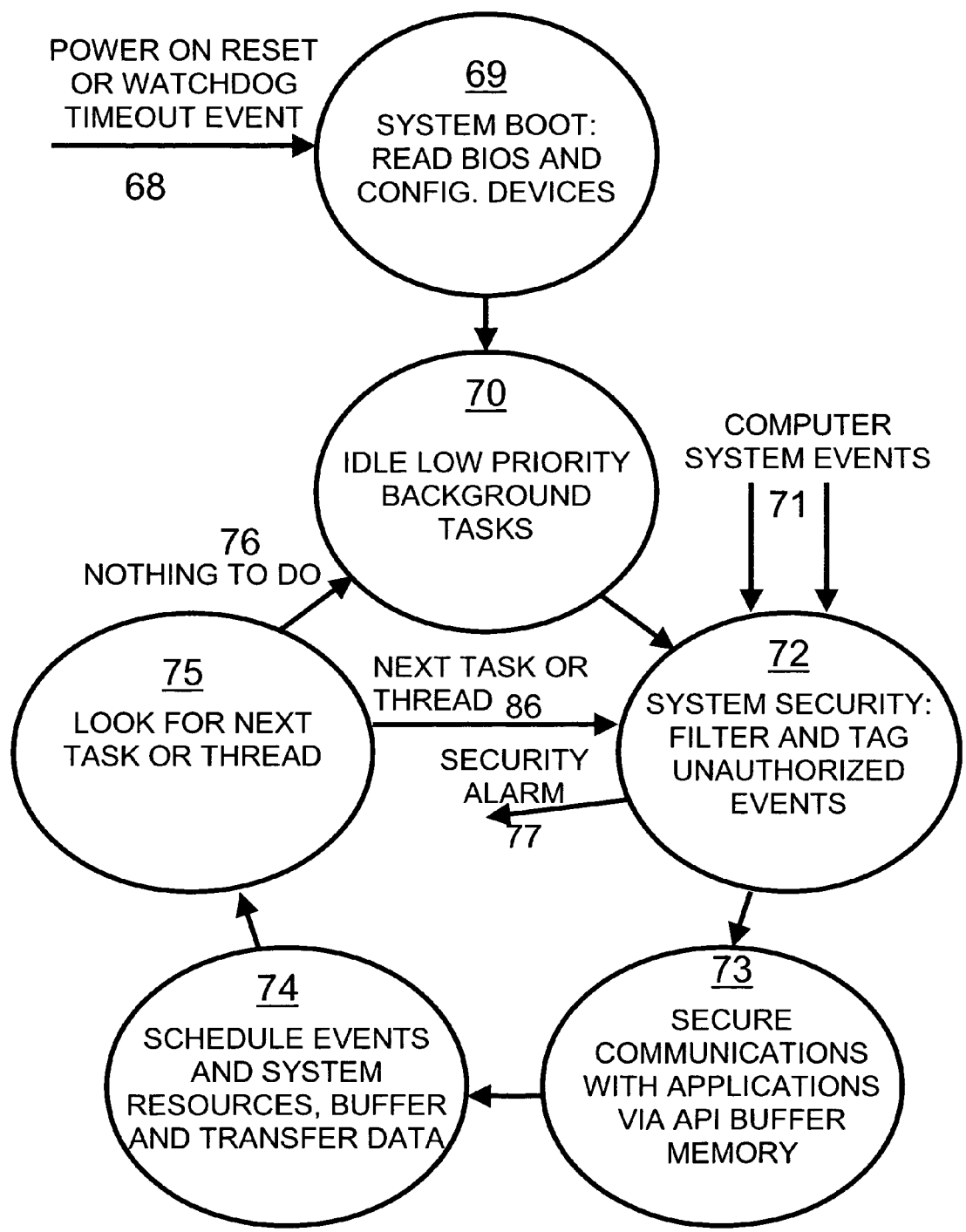
FIG. 17 is a high level flow diagram illustrating a method for the present invention using a state machine implementation.
Figure 18:
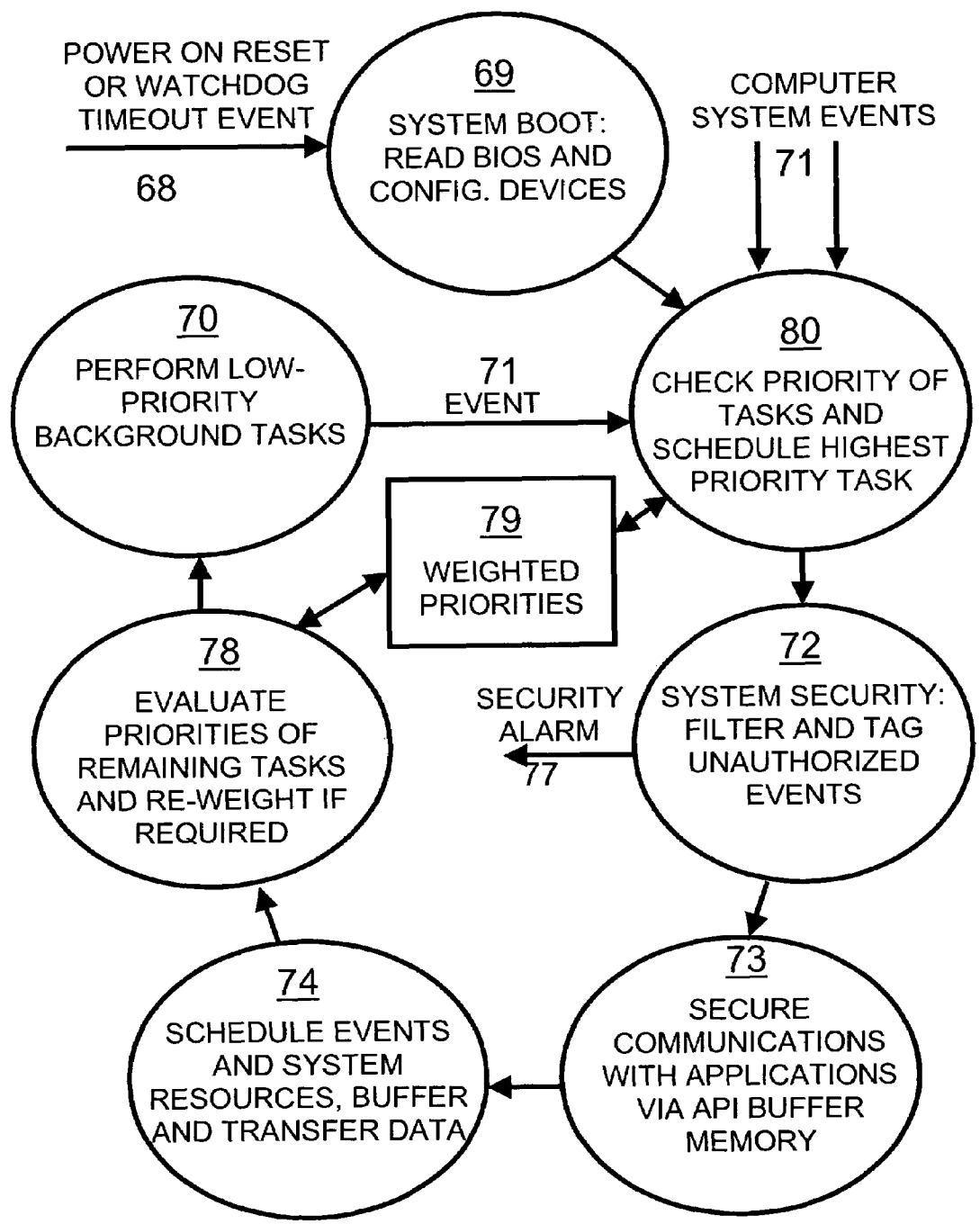
FIG. 18 is a high level flow diagram illustrating a method for the present invention using a weighted round robin implementation.
Figure 19:
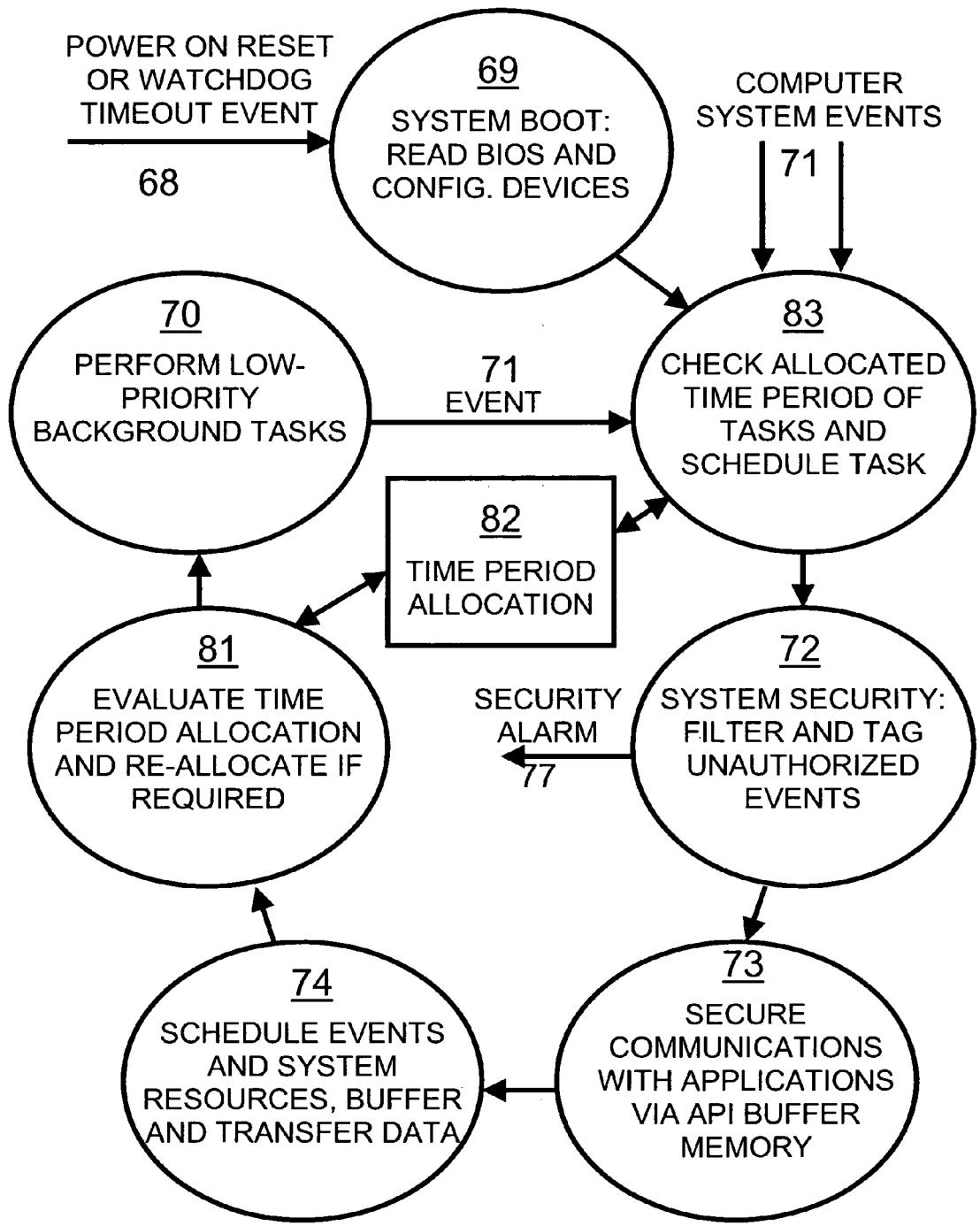
FIG. 19 is a high level flow diagram illustrating a method for the present invention using a time division multiplexing (TDM) implementation.

FIGS. 15 and 16 show a high level block diagram representing one embodiment for present invention 12; a more detailed illustration for event and security handling is given in FIG. 16. The controller and resource management system event handler receiver buffer 67 receives and buffers a plurality of computer system events from interfaces 42, 41, 29–35, 37 or 38, the events are sent to the event handler 66 via 65 where the events are assigned a type identifier label 101 and security level identifier label 102; here the events are categorized and also prioritized based on the type identifier label and security level identifier labels. The computer system event data received from interfaces 42, 41, 29–35, 37 or 38 is buffered in receiver buffer 67 and takes a separate path 64 from the type identifier label and security level identifier labels 65 in order to provide hardware security protection 6 of all untrusted content data received. The identifiers are not required to pass thru the data interrogator/filter 103 since the identifiers are generated internally by 67 and are therefore viewed as inherently trusted content by the present invention. The data and identifiers are routed to the system security function 6 by the routing function 104. The received data is then interrogated by the system security function 6 (to determine whether it is from an unauthorized source, a suspect source or an authorized source), and further classified based on the results of this interrogation as well as the type and security level identifier labels assigned previously. The data is classified by 105 into at least three severity levels according to a predetermined level of security threat, tagging the data in 105 as "red" to denote unauthorized accesses, "yellow" to denote suspect accesses or "green" to denote authorized accesses. The "red" tagged data can trigger exception events such as storing the event in non-volatile memory, storing to disc, messaging the processor, interrupting the processor via secure interrupts 100, resetting the present invention or computer system or messaging another system resource 6. Yellow-tag data can be buffered for further interrogation by the present invention, the processor or some other system resource. Further interrogation of yellow-tag data will determine if it should ultimately be tagged "red" or "green". Data can never remain yellow and must be dropped into the "red" bucket if no determination can be made within a timeout period. Data tagged as "green" can be immediately forwarded to its proper destination: system resources including the processor, system memory or another I/O interface; green-tag data can also be broadcast or multicast to a plurality of destinations. Yellow-tag data is buffered in the event port data buffers 67 while deciding its ultimate fate. Yellow tags can be sent through API buffer memory 20 and forwarded to the processor via 53, 45 and 40. Red-tag data is not buffered, the red-tag is sent directly from the security protection function 6 to the processor via 53, 45 and 40. Alternately yellow and red events may be logged in non-volatile memory, written to disc, sent out interfaces 42, 41, 29–35, 37, interrupt the processor via secure interrupts 100, or cause a watchdog timeout event. Green-tagged data is forwarded via 62 to the resource scheduler 19. The resource scheduler may be implemented as a state machine as shown in FIG. 17, a weighted round-robin machine as shown in FIG. 18 or a time division multiplexed machine as shown in FIG. 19. The resource scheduler prioritizes the green-tags and checks to see if the processor needs servicing or if a higher-priority task has been scheduled before scheduling the green-tag event. The scheduler can prioritized based on the importance of the pending process as in prior art computer systems, or it can prioritize based on the security threat level assigned to the computer system event for the pending process. The scheduler has an integral memory manager 39 that manages the shared memory resources via interface 23. The resource scheduler will forward all data to the appropriate interfaces such as 23, 40, 42, 41, 29–35 or 37. The present invention is also capable of broadcasting and multicasting as well as policing and rate matching various interfaces.

External clocks are received on interfaces 90–92; an internal clock generator with integral phase lock loops (PLLs) 61 provides clocks at multiples or submultiples of the external clocks. The integral watchdog timer 5 is supplied with primary 93 and secondary 94 redundant clocks that are source-independent of each other, clocks 90–92 and all other system clocks including all processor clocks.

The present invention is provided with in integral watchdog timer 5 that functions independently of the processor and all other computer system functions, including functions internal to the present invention. The integral watchdog timer is provided as an operationally separate and independent monitor to augment the prior art processor watchdog timer. This watchdog is provided specifically to monitor the health of the present invention 12. This important function is unique to this invention since it is impossible for prior art to provide a watchdog timer specifically for the functions contained in the present invention since the processor and operating system within prior art systems are mutually dependent functions and cannot be monitored by separate and independent watchdogs. Failure of the present invention to "throw the dog a bone" by refreshing the timeout will cause a timeout and resetting of the present invention and possibly the processor or entire computer system. The additional watchdog provides protection against catastrophic failures specific to the present invention and mitigates problems associated with single event, common-mode failures within prior art systems by providing a second, separate and independently operating watchdog unique to this invention.

The basic input output system (BIOS) with device drivers 21, the device configuration manager 44 and device configuration table 58 (alternately stored in external memory) are provided primarily for booting or updating the computer system via interfaces 23, 40, 42, 41, 29–35 or 37. The processor and shared system memory no longer have to get involved in booting or configuring the system, or interfacing with computer system resources via device drivers; no software is required. The invention is an improvement over prior art since booting will happen quicker and also be protected from unauthorized accesses, corruption or application program errors; the system is therefore more reliable, stable, secure and higher-performing when compared to prior art computer systems.

It is important to note that all data externally entering or exiting the computer system can be interrogated for unauthorized attempts to access system resources. Data entering the system should always be checked whereas data exiting the system need not always be checked. Furthermore, all program and user data transferred between the processing function and remaining resources and functions of the computer system is required to pass through the integral system security function of the present invention. Those skilled in the art will notice that the present invention can be considered the independently operating; centralized controlling, managing and security function for the entire computer system. Whereas the present invention has become the heartbeat for the entire computer system, the security function integral to the present invention has become the key centralized and vitally important function for the entire computer system. All data passing through the present invention, especially processor data; is ultimately subjected to rigorous interrogation by the integral system security function 6. The present invention improves upon prior art by providing a system-level security function that is conceptually, physically, functionally, operationally and electrically independent of all other functions and resources internal or external to the computer system (most importantly independent of the processing function). The present invention further improves upon prior art by providing an independently functioning and operating watchdog timer that exists only to protect the present invention from catastrophic failure events FIGS. 17, 18 and 19 have been included for completeness as reference only, with the exception of the system security function unique to the present invention. Those skilled in the art will have little difficulty producing the present invention with the information herein supplied. Many event/task scheduling methods exist in the public domain and it is understood that the referenced implementations should be used only as a rough guide to the manufacture of the present invention. FIG. 17 is a high level flow diagram illustrating a method for the present invention using a state machine implementation. FIG. 18 is a high level flow diagram illustrating a method for the present invention using a weighted round-robin implementation. FIG. 19 is a high level flow diagram illustrating a method for the present invention using a time division multiplexing (TDM) implementation.

FIG. 17: The state machine version illustrates a simple event handler and resource scheduler with security protection that represents the simplest form of the present invention that would be used primarily for single-user systems with only a handful of tasks or threads running at any given time. The operation begins following a power on reset or watchdog timeout event 68; the system initiates a computer system boot and configures all computer system devices via device drivers 69 before entering an idle state 70; the system performs low priority background tasks in the idle state. When the system recognizes a new computer system event 71 either by receiving an interrupt, by polling system status registers, by receiving a new message from a computer system resource or by some other means, it will immediately invoke the integral system security function 72 where received data is filtered and reviewed for unauthorized access to the system. The data is then tagged as "red", "yellow" or "green" whereby red denotes an unauthorized access attempt; yellow denotes suspect data and green denotes an authorized access. Data tagged as red may prompt the system into sending an alert message to the processor, sending a secure interrupt to the processor 100, sending an alert message to a system interface or may initiate a timeout of the integral watchdog timer. The action taken by the system is based on a set of dynamic rules that are configured by the user or system administrator. These rules may be influenced by such factors as type of system, security protection threshold, source of data, priority of data, frequency of unauthorized attempts and many other factors. Data tagged as yellow is buffered and further interrogated based on a set of dynamic rules that are configured by the user or system administrator. If the received data is tagged green then the application program interface (API) buffer memory is interrogated in state 73 to find out whether or not the processor is waiting to perform a higher-priority process or higher security level process than the current process. Based on this information, the event scheduler and resource manager 74 will control and manage the events and transfer of data for the entire computer system. Once the present invention has determined what to do next, the data will be forwarded to the processor via API buffer memory interface 40 or to the integral memory manager buffers on its way to shared system memory 23. The data can also be broadcast or multicast out a plurality of interfaces including 29–35, 37, 38 41 or 42. Once the current process is complete the system will look for the next process to execute 75. If nothing is found 76 the system revisits the idle state 70. If the system finds something to do 86 it will immediately enter the system security state 72 to begin filtering and reviewing data for unauthorized accesses to the system.

FIG. 18: The weighted round-robin implementation illustrates a more sophisticated event handler and resource scheduler with system security protection. The weighted-round robin version is similar to the state machine previously described with the exception of the following functions: 78, 79 and 80. This version allows multiple processes to be prioritized and weighted according to system security protection level, user preferences, interface, data type or any number of priority categories 79. Multiple processes are handled "round-robin" with each receiving service in an endless chain based on dynamic weighting of priorities 78, 79. This version offers more flexibility and granularity to the event handler and resource managers for making scheduling and resource usage decisions. The weighting applied to the multiple processes can be applied based on a fairness algorithm as well.

FIG. 19: The Time Division Multiplexing (TDM) version is similar to the state machine previously described with the exception of the following functions: 81, 82 and 83. The TDM version evaluates each of the multiple processes 81 and then dynamically allocates a time period to each of the multiple processes 82 representing a portion, or time period of the overall system bandwidth 83. This type of system might be beneficial when dealing with multimedia applications involving real-time audio and video processing.

Figure 20:
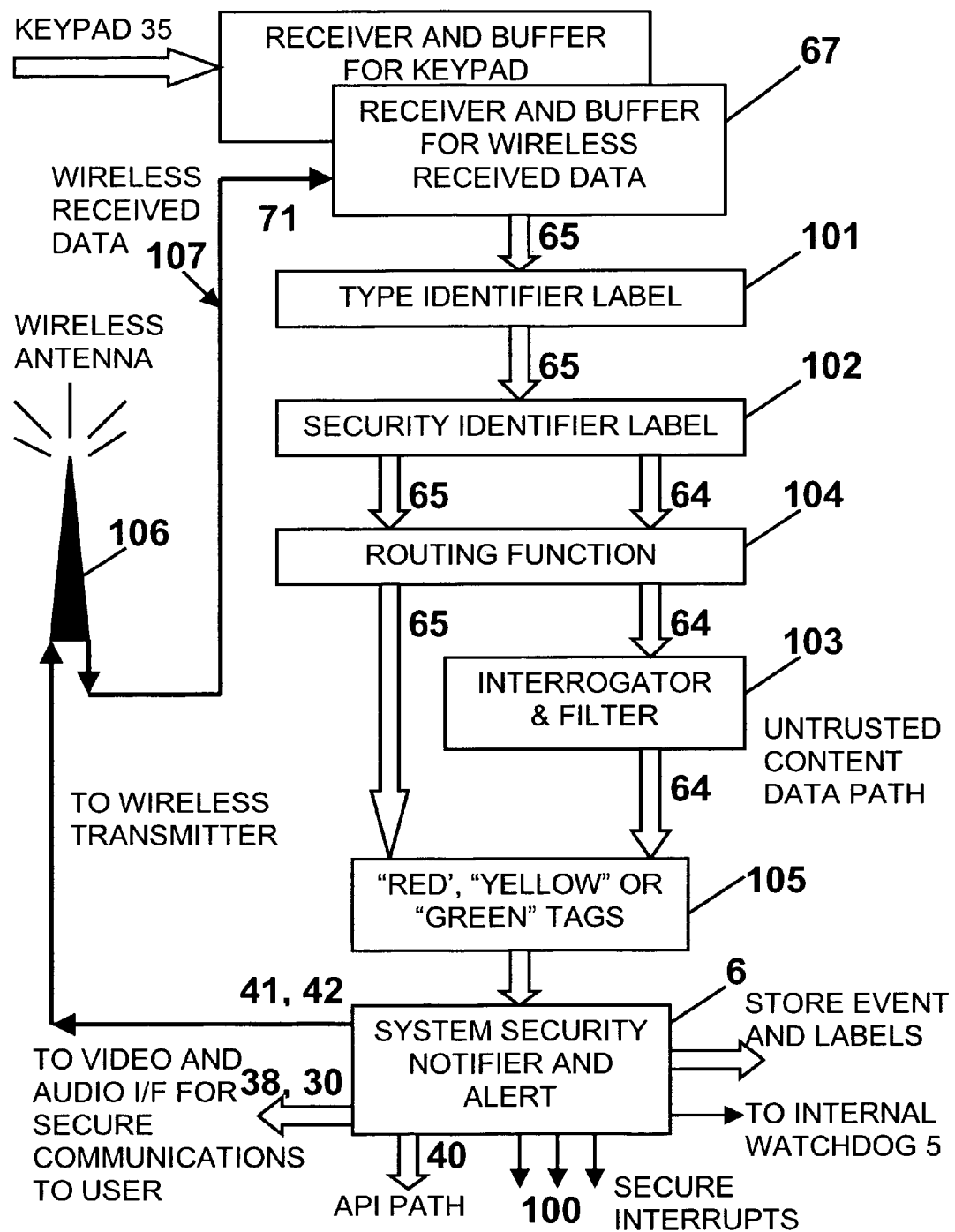
FIG. 20 shows one embodiment where the improvements and advantages of the present invention are used for wireless communication for products such as wireless cellphones, wireless personal digital assistants (PDAS) or wireless portable computers such as laptop personal computers.

FIG. 20 shows one embodiment where the improvements and advantages of the present invention are used for wireless communication for products such as wireless cellphones, wireless personal digital assistants (PDAs) or wireless portable computers such as laptop personal computers. The security advantages of the present invention are clearly illustrated in this embodiment. Computer system events 71 caused by keypad entry 35 or wireless received data 107, received from antenna 106 are received and stored in the receiver buffer 67. The local keyboard event and data 35, as well as the reception of remote wireless data 106 will both follow the secure path through the present invention as described previously herein. Only secure and trusted data will be stored in system memory. Only secure and trusted data will make it out to the video 38 and audio 30 user interfaces. Data tagged as "yellow" or "red" will prompt the system security notifier and alert function to inform system resources of the security threat received from the keypad 35 or the wireless received data 107. Wireless communication is particularly susceptible to unauthorized access by untrusted content. The present invention addresses that problem in this embodiment.

A variety of implementations can be used in combination or dynamically swapped by replacing an existing implementation with a new version by dynamically loading the new version into the present invention from non-volatile memory. Those skilled in the art will realize that commonality exists in the three implementations previously described; this of course lends itself to reuse of system functions (modules) and provides the additional benefit of having the inherent capabilities of merging the best of all three designs into one single combination of the three. The combination of the aforementioned event handlers and resource schedulers is the preferred embodiment for providing ultimate performance for a given set of computer system applications while also providing efficient reuse of design functions. These implementations are presented as a guide to those skilled in the art and are not intended to limit in any manner whatsoever the construction of the present invention.

Those skilled in the art will realize that an example of a fully functional computer system operating independently of the processor and processor instructions can be demonstrated using the embodiment 12 of the present invention in conjunction with high level flow diagrams of FIGS. 17–19. The present invention 12 will begin initial operations after receiving a power on reset event 68; the functions primarily responsible for booting the computer system and configuring the computer system devices are functions: clocks 61, BIOS and device drivers 21, device configuration table 58 and device configuration manager 44 (keeping in mind that other functions of the present invention 12 are required to support the booting and configuring operations; they are also required to execute low priority background tasks.) Once booting and configuring are complete, the present invention 12 is now prepared to respond to computer system events 71, initiated on interfaces 23, 40, 29–35, 37, 38 41 or 42 consisting of; interrupts, received messages or state changes in status buffers. Assume an interrupt is received from keyboard interface 35 indicating that a local user of the computer system has input a text message to be sent out another interface 29; the present invention must also send this very same message to the user interface (video monitor) 38. The event handlers 66, 67 along with the resource scheduler 19 and system security function 6 will categorize the keyboard event and proceed to place a "red", "yellow" or "green" tag to the event. Assume the keyboard event gets a "green" tag; since keyboard entries are very slow events that are buffered, the present invention may want to finish off some background processes 70 while waiting for the high-water threshold of the keyboard buffer before starting to service the keyboard buffer. When the system has determined that it is time to service the keyboard it will forward all data to the system security function 22 via keyboard interface 35, 110 controller hub 36 and internal bus 47. Each keystroke is interrogated by the system security function 6 in order to flag unauthorized attempts to access computer system resources via the keyboard interface 35. Assume a complete text message was entered and some of the data has been flagged "very-bright-red", (a certain four keys were mischievously pressed). The system security protection can choose not to display these four keys back to the user via the video monitor. The remaining "green-flagged" data will be displayed on the video monitor. Meanwhile the data has been temporarily buffered in computer system memory 25 via memory controller 39 and memory interface 23. If the present invention detects a button "click" event on mouse I/F 34 it may respond by retrieving the stored data from memory 25 via memory I/F 23 and memory controller 39. The present invention can also choose to re-verify the data using the system security function 6 depending on how "aged" the data is. Since the data was assigned type and security level identifier labels when previously stored in computer system memory 25, those identifiers can now be read in order to determine the proper destination(s) for the data. The data can now be forwarded to any computer system interface, as well as broadcast or multicast out multiple interfaces if need be. Assume this text message is intended to be sent to a local printer, to a friend on a local area network(LAN)29, to a video game executing as another process on this same computer system and also to a text-to-speech interface just for fun (it's good the present invention was able to previously filter those four mischievous keys just in case the volume is cranked up on the text-to speech audio interface 30). The present invention is fully capable of broadcasting, (or more likely in this case multicasting) to multiple destinations. In this example, the keyed data has already been sent to the user interface via 38; it can now be multicast to the local printer attached to either serial input/output (SIO)32 interface or universal serial bus (USB) 31. The data is also multicast to local area network (LAX) interface 29 via layer-2 media access controller (MAC) 46 integrated into I/O controller hub 36; the "friend" receives the eagerly awaited text message (sans the missing four keys); meanwhile the text-to-speech message has been sent out coder/decoder (CODEC) interface 30 for the long awaited audio announcement (again, sans four key letters). This example is intended to highlight some of the unique functions and features integral to this invention: system-level events can take place independently of the computer system processor, multi-level security is available at every interface and in every direction within the present invention, data can be multicast or broadcast out multiple computer system interfaces.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

I claim:

1. In a computer, having a plurality of computer resources including a processor and memory, a controller and resource management system, wherein said controller and resource management system is implemented in electronic hardware that is physically separate and functionally independent of said processor, said controller and resource management system comprising:
   a watchdog timer function for monitoring the health and operation of said controller and resource management system;
   a configuration and device driver function for configuring said plurality of computer resources;
   a plurality of computer input/output interfaces for coupling said controller and resource management system to said plurality of computer resources, including a computer input/output interface for communicatively coupling control messages to said processor;
   a plurality of buffers for buffering data coupled to said plurality of computer input/output interfaces, including an application program interface (API) buffer for communicatively coupling control messages to said processor;
   a memory controller for controlling memory data communications between said memory and said controller and resource management system;
   an input/output controller for coupling said controller and resource management system to said plurality of computer input/output interfaces;
   event priority and scheduler logic which inputs said memory data via said memory controller, and inputs computer events via said input/output controller, and responsive to said inputs, outputs data comprising: prioritized and scheduled computer events, prioritized and scheduled computer memory data; and
   security filter logic which inputs said prioritized and scheduled data, and responsive to said inputs, outputs data comprising: filtered and verified computer events, filtered and verified computer memory data, and responsive to said output, communicatively couples said output to said processor such that prioritized, and scheduled, and verified computer events and computer memory data is coupled to said processor through said controller and resource management system; and, wherein said controller and resource management system does not require processor executable instructions to operate.

2. The controller and resource management system of claim 1 wherein said computer is a wireless communicating device such as a cellphone.

3. The controller and resource management system of claim 1 wherein said computer is a portable computer such as a hand-held personal digital assistant (PDA) or laptop personal computer.

4. The controller and resource management system of claim 1 wherein said computer is a personal computer.

5. The controller and resource management system of claim 1 wherein said computer is a communications server.

6. The controller and resource management system as recited in claim 1 wherein said controller and resource management system is electrically isolated from said plurality of computer resources, including at least said processor.

7. In a personal computer, having a plurality of personal computer resources including a processor and memory, a controller and resource management system, wherein said controller and resource management system is implemented in electronic hardware that is physically separate and functionally independent of said processor, said controller and resource management system comprising:
   a watchdog timer function for monitoring the health and operation of said controller and resource management system;
   a configuration and device driver function for configuring said plurality of personal computer resources;
   a plurality of personal computer input/output interfaces for coupling said controller and resource management system to said plurality of personal computer resources, including a personal computer input/output interface for communicatively coupling control messages to said processor;
   a plurality of buffers for buffering data coupled to said plurality of personal computer input/output interfaces, including an application program interface (API) buffer for communicatively coupling control messages to said processor;
   a memory controller for controlling memory data communications between said memory and said controller and resource management system;
   an input/output controller for coupling said controller and resource management system to said plurality of personal computer input/output interfaces;
   event priority and scheduler logic which inputs said memory data via said memory controller, and inputs personal computer events via said input/output controller, and responsive to said inputs, outputs data comprising: prioritized and scheduled personal computer events, prioritized and scheduled personal computer memory data; and
   security filter logic which inputs said prioritized and scheduled data, and responsive to said inputs, outputs data comprising: filtered and verified personal computer events, filtered and verified personal computer memory data, and responsive to said output, communicatively couples said output to said processor such that prioritized, and scheduled, and verified personal computer events and personal computer memory data is coupled to said processor through said controller and resource management system; and, wherein said controller and resource management system does not require processor executable instructions to operate.

8. A method for controlling and managing a plurality of computer resources, including a processor for performing a plurality of processes, and handling a plurality of computer events and memory data such that said method is functionally independent of said processor, said method comprising:

controlling and receiving said memory data communications via a memory controller;

controlling input/output interfaces via an input/output controller;

receiving said plurality of computer events via said input/output controller;

providing a security function for filtering and verifying said plurality of computer events and said memory data, and further notifying said plurality of computer resources of said plurality of computer events and said memory data such that said security function is functionally independent of said processor, and such that said plurality of computer events and said memory data are filtered and verified prior to arrival at said processor;

managing and scheduling said plurality of processes performed by said processor;

prioritizing said plurality of processes performed by said processor;

configuring a watchdog timer and reacting to a timeout event of said watchdog timer; and configuring said plurality of computer resources via a configuration and device driver function.

* * * * *